(12) United States Patent
Teichert

(10) Patent No.: US 8,083,029 B2
(45) Date of Patent: Dec. 27, 2011

(54) DEVICE FOR ENABLING ACCESS TO A STRUCTURE ABOVE GROUND LEVEL

(75) Inventor: Paul Teichert, Sydals (DK)

(73) Assignee: PP Energy ApS, Nordborg (DK)

( * ) Notice: Subject to any disclaimer, the term of this patent is extended or adjusted under 35 U.S.C. 154(b) by 1064 days.

(21) Appl. No.: 10/585,005

(22) PCT Filed: Dec. 30, 2004

(86) PCT No.: PCT/DK2004/000930
§ 371 (c)(1),
(2), (4) Date: Sep. 26, 2007

(87) PCT Pub. No.: WO2005/064152
PCT Pub. Date: Jul. 14, 2005

(65) Prior Publication Data
US 2009/0020361 A1    Jan. 22, 2009

(30) Foreign Application Priority Data

Dec. 30, 2003 (DK) .................................. 2003 01955
May 8, 2004 (DK) .................................. 2004 00737

(51) Int. Cl.
*E04G 3/28* (2006.01)

(52) U.S. Cl. ........ 182/128; 182/136; 182/142; 182/150; 182/187

(58) Field of Classification Search .................. 182/128, 182/136, 142, 148, 150, 187; 376/260
See application file for complete search history.

(56) References Cited

U.S. PATENT DOCUMENTS

| | | | | |
|---|---|---|---|---|
| 350,289 A | * | 10/1886 | Brown | 182/136 |
| 860,359 A | * | 7/1907 | Dudley | 182/133 |
| 2,043,128 A | * | 6/1936 | Sutton | 182/150 |
| 2,336,432 A | * | 12/1943 | Wilson | 182/69.4 |
| 3,960,242 A | * | 6/1976 | Saxonmeyer | 182/36 |
| 4,407,392 A | * | 10/1983 | Lazzari | 182/128 |
| 4,690,246 A | * | 9/1987 | Hornagold et al. | 182/2.3 |
| 5,694,734 A | | 12/1997 | Cercone et al. | |
| 5,964,734 A | | 10/1999 | Peeno | |

(Continued)

FOREIGN PATENT DOCUMENTS

DE    32 28 732    2/1984

(Continued)

OTHER PUBLICATIONS

Australian Application No. 2004308998 dated May 27, 2009.

(Continued)

*Primary Examiner* — Alvin Chin Shue
*Assistant Examiner* — Colleen M Quinn
(74) *Attorney, Agent, or Firm* — McCormick, Paulding & Huber LLP

(57) ABSTRACT

The present invention relates to a device for enabling access to a structure above ground level by lowering and/or lifting the device in relation to the structure, the device comprising a first endless frame structure defining an opening, wherein at least part of the first endless frame structure forms a track portion, the track portion being adapted to guide an, in relation to the track portion, movable object, such as a gondola, along the track portion. The device may further comprise a second endless frame structure defining an opening, the second endless frame structure being aligned with the first endless frame structure.

27 Claims, 23 Drawing Sheets

U.S. PATENT DOCUMENTS

| | | | |
|---|---|---|---|
| 6,848,539 B2 * | 2/2005 | Lee et al. | 182/128 |
| 6,856,663 B2 * | 2/2005 | Colditz et al. | 376/260 |
| 6,856,664 B2 * | 2/2005 | Pence et al. | 376/260 |
| 7,139,357 B2 * | 11/2006 | Colditz et al. | 376/260 |
| 7,228,939 B1 * | 6/2007 | Prater | 182/141 |
| 7,740,107 B2 * | 6/2010 | Lemburg et al. | 182/142 |

FOREIGN PATENT DOCUMENTS

| | | |
|---|---|---|
| DE | 35 26 088 | 1/1987 |
| DE | 43 39 638 | 5/1995 |
| DE | 296 03 278 | 6/1996 |
| DE | 199 09 698 | 4/2000 |
| DE | 199 44 801 | 3/2001 |
| DE | 201 20 381 | 4/2002 |
| EP | 1 179 647 | 2/2002 |
| EP | 1 350 953 | 10/2003 |
| GB | 1 221 924 | 11/1966 |
| JP | 09 021229 | 1/1997 |
| JP | 09 302915 | 11/1997 |
| JP | 2004 293182 | 10/2004 |
| NL | 1 011 375 | 8/2000 |
| WO | WO 93/09314 | 5/1993 |
| WO | WO 2004/022970 | 3/2004 |

OTHER PUBLICATIONS

International Search Report; PCT/DK2004/000930; Jul. 26, 2005.

\* cited by examiner

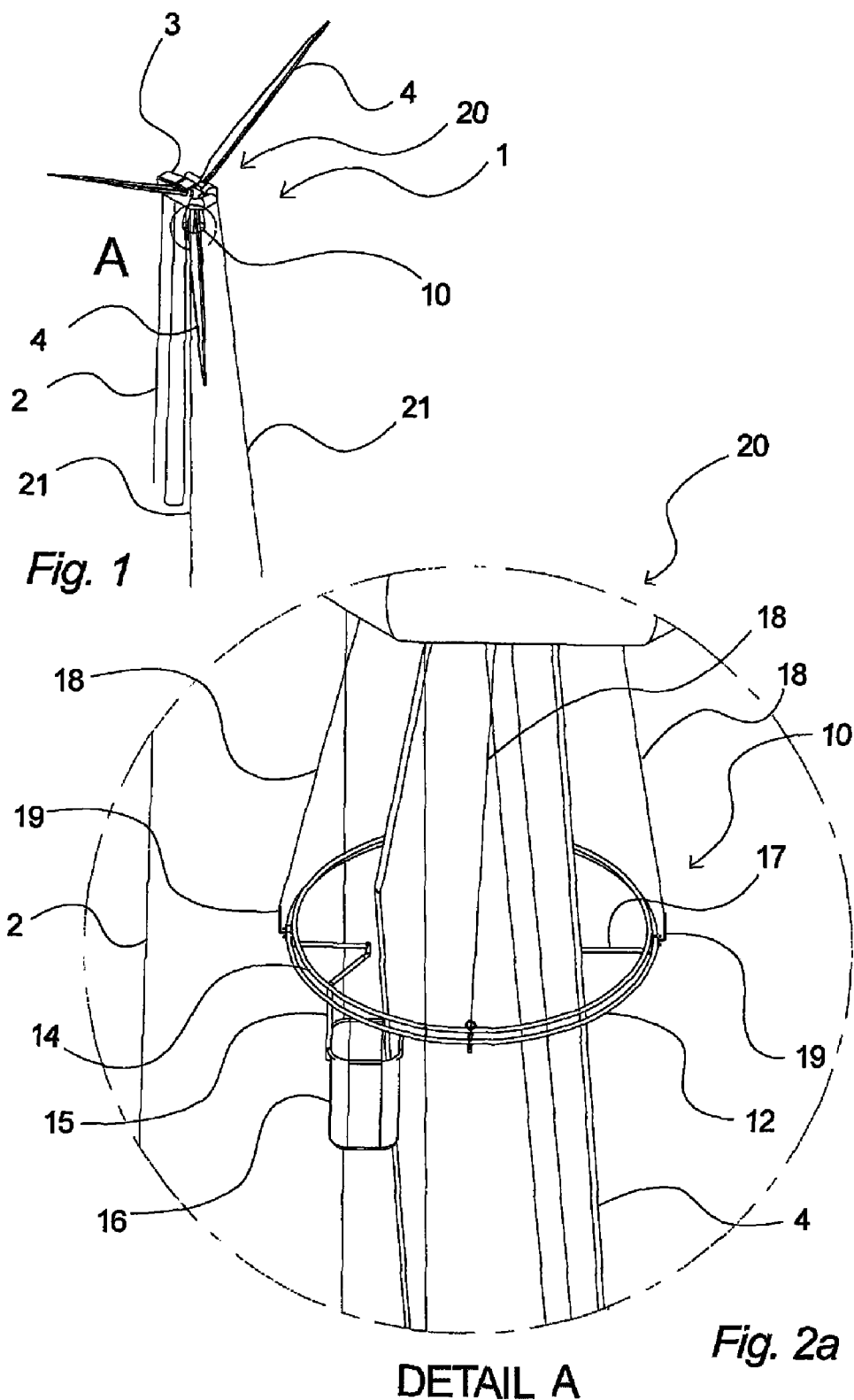

DETAIL A

DETAIL B

DEVICE FOR ENABLING ACCESS TO A STRUCTURE ABOVE GROUND LEVEL

FIELD OF THE INVENTION

The present invention relates to a device for enabling access to a structure above ground level, e.g. of considerable height such as a wind turbine, a rotor blade or a tower of such a wind turbine, the device comprising a part that may be lowered and/or lifted in relation to the structure.

BACKGROUND OF THE INVENTION

Within the field of wind turbines it is necessary to perform work on parts that is situated at a considerable height above ground level (or sea level, when sea wind turbines are concerned) such as e.g. repair of rotor blades, the surface of these, surface treatment of rotor blades and the tower etc. Further, it has been recognized that it is advantageous or even necessary to clean such parts and in particular the rotor blades in order to maintain good results as regards the power efficiency. Further, it may be advantageous to perform other forms of maintenance in order to achieve good power production results and optimal economic results, such as e.g. surface treatments, inspection etc.

In order to perform such work a number of hoisting arrangements have been proposed in the prior art.

Such a hoisting arrangement is known from German utility model DE 296 03 278 U in which suspension means are fastened to each of the two rotor blades near the hub of the rotor once the windmill has been brought to a stop and with one rotor blade pointing straight downwards. A special work platform with a through-going slit at the bottom has been fixed to these suspension means so that the rotor blade pointing downwards could be inserted into this slit. The work platform has subsequently been hoisted upwards in a stepwise manner, while the crew has rinsed the surface of the rotor blade manually, e.g. with one person located on each side of the rotor blade.

Even with such an arrangement, it is a time-consuming process to carry out a cleaning of the rotor blades of a windmill, just as such a known arrangement would probably require the use of machinery, such as a crane, for fixation of the suspension means. Further, the platform itself will have a considerable weight and size, thereby leading to further costs and use of heavy machinery for lifting and lowering the platform.

Devices of corresponding kind are known from DE 199 09 698 A1 and DE 43 39 638 A1, which are encumbered with the same disadvantages as those mentioned above, including that extensive use must be made of special material such as cranes, for example mobile cranes, or relatively comprehensive materials which, for example, are mounted on the turbine tower beforehand.

Further, these prior art systems are generally not configured in a manner facilitating user-friendliness and do not provide the personnel with an optimal safety environment.

Thus, it is an objective of the invention to provide an improved device for performing such work at a structure such as a wind turbine, e.g. on a rotor blade or on a wind turbine tower.

It is a further objective to provide such a device whereby improved user-friendliness and safety may be achieved.

A further objective is to provide such a device that allows access to virtually all parts of e.g. a rotor blade with relatively simple and few means.

It is also an objective to provide such a device that may be designed as a relatively light structure and in relatively light materials while maintaining safety standards and even provide improvements in safety aspects.

These and other objectives are achieved by the invention as explained in detail in the following.

SUMMARY OF THE INVENTION

In a first aspect, the invention relates to a device for enabling access to a structure above ground level, e.g. of considerable height such as a wind turbine, a rotor blade or a tower of such a wind turbine, the device comprising a part that may be lowered and/or lifted in relation to the structure, wherein the device comprises
  a first main part that is suspended by the structure, and
  a second main part that comprises means for carrying an object such as a tool device or means for carrying a person, and that is movably connected to the first main part.

Hereby an arrangement is achieved by means of which the user may be able to reach or access all parts of the surface of e.g. a rotor blade of a wind turbine, since the second part is moved, e.g. rotated in relation to the first part in order to reach a desired location.

The device according to the invention, e.g. carrying a tool device or one or more persons may be located in any vertical position along e.g. a wind turbine rotor blade or tower, preferably controlled by a person at the device or at ground level, e.g. by controlling the length of the means, e.g. wires suspending the first main part or by climbing up or down such suspending means. Further, the means for carrying a tool or a person may be controlled to rotate preferably within a full revolution, i.e. 360° or even more around the structure, e.g. the wind turbine rotor blade or tower and to be stopped at any position, preferably also controlled by a person at the device.

Thus, a large and heavy platform is avoided, since a person using the device according to the invention may be located at virtually any desired position in relation to the structure, e.g. a wind turbine rotor blade or tower. Hereby the necessary work may be performed using a relatively light construction. Further the safety standard is enhanced since a person using the device according to the invention may be secured in a reliable and dependable manner and since such a person need not move around on a platform that may e.g. be swerving under the influence of the wind and which may be slippery in moist conditions.

Further, it is noted that such a device may be configured to be lowered and lifted by means of hoisting apparatus placed outside the device, e.g. on the wind turbine, on anchoring means and/or at the ground, e.g. on a vessel or at a vehicle, whereby a pull is exerted by means of wires, lines, etc., possibly over pulleys etc. placed on the wind turbine. Instead, the device may be configured to be lowered and lifted by means of hoisting apparatus placed at the device, whereby the device will be able to operate independent of e.g. a support vessel or a vehicle on the ground.

The device may comprise a counterweight located essentially opposite the means for carrying an object. Hereby it is achieved that a state of balance will be inherent in the system, adding to the safety and user friendliness of the device according to the invention.

The second main part may comprise a counterweight located essentially opposite the means for carrying an object, e.g. a person. Hereby it is achieved that the balance of the system is maintained in a simple manner as the counterweight moves with the person or persons using the device.

The means for carrying an object, e.g. a person may be adjustable in relation to the second main part. Hereby it will be possible for the user(s) not only to rotate the two parts in order to reach a desired position, but also to displace the platform, the seat etc. in relation to the second main part. Hereby the flexibility is enhanced. The means for carrying an object, e.g. a person may be displaced linearly and/or rotatably in relation to the second main part. Hereby the user will in an effortless manner be able to reach any part of the surface without regard to the distance from the second part to the surface in question.

The means for carrying an object, e.g. a person may be connected to the second main part by means of at least one linkage or connection that provides a rotatable connection. Hereby the displacement in relation to the second part may be achieved in a particular simple and efficient manner. Advantageously, the device, e.g. the first main part may be suspended by wires, lines or the like from anchoring means.

The counterweight may be designed to be controlled in dependence on the position of the means for carrying an object, e.g. a person. Hereby the balance of the system will be maintained even when the means for carrying a person is displaced in relation to the second part, e.g. towards the centre of the circular parts. The counterweight may be mechanically connected to the object, possibly via intermediate means, by means of cables, wires etc, or the connection may be performed by having a electronic or electric link, e.g. by having two in principle independent objects moving in synchronicity, for example by moving the two objects by means of servo motors and having a control system controlling the relation between these, etc.

The means for carrying an object, e.g. a person may comprise a work platform for one or more persons. Furthermore, the means for carrying an object, e.g. a person may comprise seating for one or possibly more persons. Hereby the device may be designed in a particular straightforward manner using a minimum of material and the person using it may enjoin an effortless use of the device while still being subjected to an optimal safety standard since the person will be fastened to the seat using belts, safety harness etc.

The device and in particular the means for carrying an object, e.g. a person may comprise control means for controlling the position of the means, e.g. the height, the angular position, the position in relation to an axis etc. Hereby, the person or the persons using the device may control the device and in particular their own position, e.g. work position in relation to e.g. the surface of a rotor blade, in an optimal manner.

The first main part and/or second main part may comprise a frame that may be essentially circular in shape. Alternatively, the first main part and/or second main part may comprise a frame having an essentially elongated shape, whereby the device may be particularly suitable for use in connection with a structure having an elongated section such as e.g. a rotor blade of a wind turbine.

The first main part may comprise a number of parts that may be assembled to form different sizes and/or forms. Hereby it is achieved that the device may be dismantled and easily transported and further it may be assembled to suit a range of differently sized structures.

The first main part and second main part may comprise a roller or a movable suspension for providing the movable, e.g. rotatable connection. Hereby the e.g. rotational movement between the two main parts may be achieved in a particular advantageous and reliable manner. Obviously, the roller suspensions may be configured in numerous manners and in suitable numbers, e.g. two, three four or more.

The device may comprise anchoring means for fastening to the structure. Such anchoring means may be pre-established or may be established particularly for the purpose of supporting the device.

The device may comprise elevation means for lifting and/or lowering of the device, the elevation means comprising wires or the like connected to the structure, e.g. to anchoring means on the structure.

The elevation means may comprise two or more such wires or the like, e.g. three, four, five etc., whereby also safety aspects are improved as well as stability etc.

Further, it is noted that elevation means in the form or wires or the like may be used for lifting and/or lowering the device according to the invention by pulling the device by means located at the wind turbine or at the ground, e.g. located at a vehicle or at a vessel.

The device may comprise a securing arrangement for stabilizing the device to the structure, whereby the effect of the wind may be neutralized, e.g. the service device will be stable in relation to the e.g. rotor blade.

The securing arrangement may comprise two securing elements for releasable pressing against the structure, e.g. a rotor blade. In this manner the stabilizing effect will be achieved in a surprisingly effective manner.

The securing elements may be inflatable, whereby the elements may press essentially evenly over the surface of the structure, and further the structure will not be treated to any harmful contact.

The securing elements may contract in length when inflated. Further, the securing elements may expand in width when inflated.

The securing elements may be located by means of adjustable fixation means, whereby the device may readily be adapted to structures, e.g. rotor blades of different sizes.

The securing elements may be rotatably mounted. Hereby it is achieved that the device may be lifted and/or lowered while the securing elements are activated, for example when performing work on a rotor blade and shifting from one level to the next. In this manner the device and the carried object will be held securely in relation to the structure, also when shifting position. Further, the securing elements may be individually inflatable. Hereby it is achieved that the position of the device and the object being carried may be adjusted in relation to the structure, for example by adding air to one element and releasing air from the other. In this manner the device will be shifted sidewards.

The securing elements may comprise means for supporting when they are not inflated. When not inflated, the securing elements may sag downwards, whereby it may prove difficult to enter e.g. a tip of a rotor blade in the space between these. To alleviate this problem, supports may be placed at an intermediate part of each, connected to frame parts, or flexible telescopic rod elements may be placed inside the securing elements from one end to the other.

The device may comprise power means, e.g. electric motors, hydraulic and/or pneumatic means for lifting, lowering and/or displacing the parts.

Hereby the device will be able to lift and/or lower itself without power assistance from e.g. a hoist located at a vehicle or a vessel. Thus, the device will be able to operate independently, e.g. without concern for power assistance from other devices. This further enhances safe operation since accidents caused by a power failure at a ground vehicle or a vessel are prohibited. Particularly when operation at sea is concerned, e.g. at sea wind turbines, such an independent configuration is preferable since a support vessel may be unstable, e.g. subjected to waves, current, wind etc. Thus, an arrangement at sea where a vessel provides the elevation by e.g. hoist(s) located on the vessel is prone to accidents and malfunction, and therefore a device comprising power means as mentioned above is advantageous not only in general but especially at sea.

Further, it is noted that even when power supply to such a device is subjected to failure, e.g. when electric power is cut off, a device according to the invention will be able to be manually operated, e.g. to be hoisted to the ground and will in general present a safe work tool for all involved, in particular persons occupying the device.

The device may comprise means for lifting and/or lowering anchoring means in relation to the structure. Hereby it will be possible to establish suitable anchoring using the device according to this embodiment, since e.g. the means for lifting and/or lowering anchoring means may be used for climbing up the structure using e.g. a relatively thin wire hanging from or lowered from the structure, until the means reaches a desired and suitable level where it establishes an anchoring location which is secure for suspending the first and the second main part of the device including e.g. the person or persons carried by the second main part.

The means for lifting and/or lowering anchoring means in relation to the structure may comprise means for elevating using a wire or the like connected to a part of the structure, e.g. the wind turbine.

The means for lifting and/or lowering anchoring means in relation to the structure may comprise an uplift device.

Still further, the device may be adapted for performing inspection, work, repair, surface treatment, etc on a rotor blade of a wind turbine.

Also, the device may be adapted for performing inspection, work, repair, surface treatment etc on a tower structure of a wind turbine.

The device may comprise a work platform for carrying at least one person, the work platform being provided with an indentation. The indentation may thus serve to accommodate the edge of a rotor blade, when the device or the platform is being lifted or lowered, whereby a stabilization has been achieved.

Further, the work platform may comprise protection means in the form of a roller or the like placed in the indentation. Hereby it is achieved that the edge of e.g. a rotor blade will not be subjected to potentially damaging contact when the device is lowered or lifted.

In addition, the work platform may comprise protection means in the form of a protection strip placed on the circumference of the platform, whereby the surface of the structure will not suffer from contact with the platform, e.g. the tubing of the railing etc.

Further, the work platform may comprise control means for controlling the lifting/lowering and the positioning in relation to the structure, which control means may be in the form of a joystick or the like and by means of which any controllable part may be individually controlled and/or controlled simultaneously with other parts. For example, if four hoisting arrangement are provided, these may naturally be controlled simultaneously, whereby an evenly lifting or lowering will be performed, but also one or more of these hoisting arrangements may be controlled separately, whereby a tilting may be performed, e.g. in order to adapt to an inclination of a rotor blade. Further, it is noted that a gyroscopic arrangement may be included in the control system.

The work platform may comprise hoisting means, whereby small parts, tools etc. may quickly be provided to a person in the platform.

The work platform and/or the device may comprise illumination means, whereby the device may be utilized also when daylight is not present, at least not in a sufficient amount, thereby enhancing the utilization rate of the device and lowering the costs.

The work platform may comprise shielding means, whereby the platform may be used in virtually any weather conditions apart from stormy conditions. The shielding means may be in the form of a transparent cover at the top, allowing the person to observe the structure above, and adjustable and/or removable shielding to the side, e.g. in the form of roller coverings or the like.

In a second aspect, the present invention relates to a device for lifting and/or lowering of objects in connection with a wind turbine or a similar construction, wherein the device comprises an uplift device and means for carrying at least one object supported directly or indirectly by the uplift device.

By means of this device, access can be gained to places on for example a wind turbine which are otherwise accessible only with difficulty, for example on a rotor blade, without the necessity of having to arrange hoists, cranes, scaffolding or the like for use for this purpose.

The uplift device will be of a relatively light construction, which by means of a relatively light vehicle or vessel can be transported to the wind turbine, where it is filled with a suitable air or gas which is lighter than the atmospheric air. When the uplift device is filled with this air or gas, with suitable dimensioning it will have such a buoyancy that it can lift itself and the object or objects which are supported by the device. The uplift device will have means for at least partial control so that it can be moved to the desired position in relation to the wind turbine, or such that it can be moved in or along a desired path, for example along a rotor blade.

The at least one object may comprise a device for inspection, treatment or the like of at least a part of the wind turbine or the similar construction.

In an advantageous embodiment relating to a device for the establishing of an anchoring on or at a wind turbine, the device may comprise
   an uplift device and
   a locking device, the locking device comprising means for gripping in or around a part of a wind turbine, preferably in a releasable manner.

It is hereby achieved with the device that a fastening can be established on or at a wind turbine, without the necessity of having to arrange cranes, including mobile cranes, hoists, scaffolding or the like for this purpose.

This is achieved by transporting the uplift device, which will be of a relatively light construction, to the wind turbine by means of a relatively light vehicle or vessel, where it is filled with a suitable air or gas, for example helium, which is lighter than the atmospheric air. When the uplift device is filled with this air or gas, with suitable dimensioning it will have such a buoyancy that it can lift itself and the locking device connected herewith. The uplift device will be at least partly controlled so that it moves to the desired position in relation to the wind turbine, where an activation of the locking device is effected so that this grips around or in a part of the wind turbine. It will be understood that the locking device is configured in such a way that it can serve as an anchor for lifting and/or lowering of various parts.

Such an anchoring can thus be used for lifting and/or lowering work platforms, cleaning apparatus, various work equipment and personnel, and there is thus also established the possibility of being able to lift and/or lower various parts such as spare parts or parts which are required for replacement. With the device, the basis will thus be established for being able, for example, to replace a wind turbine blade in a relatively simple manner.

It shall be noted that the work operations shall be understood to be a wide range of operations or actions, which can be effected in connection with a rotor blade or a wind turbine as a whole. Thus, it can include washing, other cleaning, drying, for example with air, heated air, radiation heating etc., painting, pre-treatment, after-treatment, sealing of the surface etc. Moreover, it can include inspection of the surface, examination of the surface of the rotor blade as such, for example by means of known inspection methods such as radiation examinations etc.

The device may comprise means for fastening of elements for use in positioning, lifting, lowering or the like of an object.

The uplift device may comprise at least one element, which can be filled with an air or gas, for example helium, and which are connectable directly or indirectly to the locking device.

The device may comprise a control part, possibly in the form of a wind vane, which, under influence of the wind, can at least partly control the position of the device in relation to the wind direction.

With the use of, for example, such a wind vane, a greater stability can be achieved during ascent and descent, so that even under windy conditions the use of the device will not be problematic.

The locking device may comprise a frame having two parts that are pivotally connected at one location and connected by means of an adjustable element essentially opposite the one location. Hereby an initial grip on the structure may easily be achieved, e.g. by having the two parts performing a clamping operation. Further, the frame may possibly be opened in full, allowing the gripped structure, e.g. a rotor blade, to move out of the locking device, and another rotor blade to enter the locking device.

The two frame parts may comprise elongated support parts for legs of the uplift device, whereby a stable and reliable construction is achieved.

Preferably, the locking device may be configured in such a manner that a loading of the device will result in the transfer of a force to the means for gripping in or around a part of the wind turbine.

Hereby, it will be achieved that the anchoring of the device which has been effected will be strengthened further when lifting or lowering is carried out, or when the device merely supports an object such as a washing robot, a machine, an instrument etc. Hereby, an increased lifting capacity for the device can be obtained as well as the security is improved.

The means for gripping in or around a part of the wind turbine may comprise a plurality of strips that comprise a surface having friction-enhancing means, whereby a flexible gripping arrangement as well as a gripping arrangement having enhanced strength is achieved.

In a second aspect, the present invention relates to a unit for transport and/or storage of means for performing work at a wind turbine, wherein the unit comprises a container or the like having a top part comprising lids or flaps that may be opened and fixed in an essentially horizontal position.

Hereby a construction is provided that allows the necessary parts to be transported etc. in an expedient manner and simultaneously provides a readily available work space since the opened flaps may be used as a stable platform for e.g. assembling the parts, filling the uplift device, controlling the operation etc.

The container may comprise two lids or flaps that in total cover an area larger than the area of the top of the container. Hereby an enlarged work platform is provided.

The container may comprise two lids or flaps, each one having an area substantially larger than half the area of the top of the container.

The container may comprise two lids or flaps, each one having an area substantially corresponding to the area of the top of the container. Hereby a platform having an optimal size is provided in en expedient manner.

The container may comprise an opening arrangement that in an open state may support the lids or flaps in an essentially horizontal position. In this manner the unit may relatively quickly provide a suitable work platform for the preparatory work, when a device, e.g. a service device, according to the invention is put into use.

Further it is noted that the unit in accordance with the invention may comprise such means as compressor means, an electric generator, tanks for helium, control equipment etc.

Further, it is noted that such a unit may also be utilized in connection with a device according to the invention when this is used for operating a washing robot as disclosed in WO 03/048569.

It will be understood that numerous tasks may be performed using the devices according to the invention.

In a third aspect, the present invention relates to a device for enabling access to a structure above ground level by lowering and/or lifting the device in relation to the structure, the device comprising a first endless frame structure defining an opening, wherein at least part of the first endless frame structure forms a track portion, the track portion being adapted to guide an, in relation to the track portion, movable object along the track portion.

The device may further comprise a second endless frame structure aligned with the first endless frame structure. Normally, the second endless frame structure is arranged above the first endless frame structure so that the first endless frame structure is the frame structure closest to ground.

Preferably, the first endless frame structure forms an endless track. The object may comprise a work platform adapted to carry one or more individuals. Alternatively, the object may comprise seating for one or more individuals.

The object may comprise control means for controlling the position of the object in relation to the track portion. The endless structures may form an essentially circular structure. Alternatively, and more preferably, the endless structures may form an essentially elongated structure.

The device according to the third aspect of the present invention may further comprise means for lifting and/or lowering the device in relation to the structure, the lifting and/or lowering means comprising power means such as electric motors, hydraulic and/or pneumatic means for lifting, lowering and/or displacing the device in relation to the structure. The device may further comprise control means for controlling the lifting and/or lowering means.

The device may be adapted to perform inspection, work, repair, surface treatment etc on a rotor blade of a wind turbine.

The device may further comprise an arrangement for aligning the structure with the opening defined by the endless structures. The alignment arrangement may comprise a first displaceable arm having guiding means, the first displaceable arm being adapted to be brought from a first to a second position when the device is to be aligned with the structure, the first displaceable arm being, in its second position, capable of bringing a catch element into contact with the structure via its guiding means, and bringing the device in approximate or complete alignment with the structure by withdrawing by displacement the catch member along the guiding means while the catch member is in contact with the structure. Thus, the catch member is brought to the structure by pushing it in a forward direction, whereas the step of bringing the structure in approximate or complete alignment with the device is achieved by withdrawing the catch member along the guiding means of the arm. By approximate or complete alignment is meant that the device may be brought into complete alignment with the device using only the displacement of the catch member along the guiding means. Alternatively, the structure may be brought only into approximate alignment with the device. In order to bring it into full or complete alignment an addition step may be taken—such as for example a displacement or a movement of the arm relative to the device.

By displaceable arm is meant any kind of elongated element, such as a rod, bar or stick, capable of bringing the catch member from a position at or near the frame to a position where it is in contact with the structure to be serviced, inspected or repaired. The elongated element may have a linear, a substantially linear, or a curved shaped. The shape of the elongated element may also be a combination of these shapes.

The device may further comprise a second displaceable arm having guiding means, the second displaceable arm being adapted to be brought from a first to a second position when the device is to be aligned with the structure, the first and second displaceable arms being, in their second position, capable of bringing a catch element into contact with the structure via their guiding means, and bringing the device in approximate or complete alignment with the structure by withdrawing the catch member along their guiding means while the catch member is in contact with the structure.

The first and second arms may be pivotably mounted on a first and a second support element, respectively. Similarly, the first and second support elements may be pivotably mounted on the first or second endless frame structure. The pivotably mounting of the arms to the support elements, and of the support elements to one of the endless frame structures may be provided with hinges.

The device may further comprise rotatably mounted docking means preferably arranged in the opening defined by the second endless frame structure, the rotatably mounted ducking means being adapted to fixate the structure in relation to the device when the structure has been brought into the opening defined by the second endless frame structure. Depending on the configuration of the docking means, one or several rotatably mounted docking means may be arranged in the opening defined by the second endless frame structure. Thus, the number of docking means may be 1, 2, 3, 5, 10 or even higher.

The device may further comprise a docking arrangement adapted to fixate the structure in relation to the device when the structure has been brought into the opening defined by the second endless frame structure, the docking arrangement comprising a pair of flexible belts, each belt being arranged between a rigid end point and a belt tightener, the belt tighteners and the end points being arranged on the second endless frame structure, the belt tighteners being adapted to tighten the belts by bringing them from a relaxed state to a tightened state in order to fixate the structure in relation to the device.

In a fourth aspect, the present invention relates to a device for enabling access to a structure above ground level by lowering and/or lifting the device in relation to the structure, the device comprising an endless path for individuals, the endless path defining an opening, the device further comprising an arrangement for aligning the structure with the opening defined by the endless path.

The alignment arrangement may comprise a first displaceable arm having guiding means, the first displaceable arm being adapted to be brought from a first to a second position when the device is to be aligned with the structure, the first displaceable arm being, in its second position, capable of bringing a catch element into contact with the structure via its guiding means, and bringing the device in approximate or complete alignment with the structure by withdrawing the catch member along the guiding means while the catch member is in contact with the structure.

The device may further comprise a second displaceable arm having guiding means, the second displaceable arm being adapted to be brought from a first to a second position when the device is to be aligned with the structure, the first and second displaceable arms being, in their second position, capable of bringing a catch element into contact with the structure via their guiding means, and bringing the device in approximate or complete alignment with the structure by withdrawing the catch member along their guiding means while the catch member is in contact with the structure.

The device may further comprise rotatably mounted docking means arranged in the opening defined by the endless path, the rotatably mounted ducking means being adapted to fixate the structure in relation to the device when the structure has been brought into the opening defined by the endless path. Depending on the configuration of the docking means, one or several rotatably mounted docking means may be arranged in the opening defined by the second endless frame structure. Thus, the number of docking means may be 1, 2, 3, 5, 10 or even higher.

BRIEF DESCRIPTION OF THE DRAWINGS

The invention will be described in detail in the following with reference to the drawings, in which FIG. 1 illustrates a wind turbine with a device according to an embodiment of the invention, FIG. 2*a* shows in a larger scale part of FIG. 1 showing the device in a detailed view.

DETAILED DESCRIPTION OF THE INVENTION

Figure 2B:
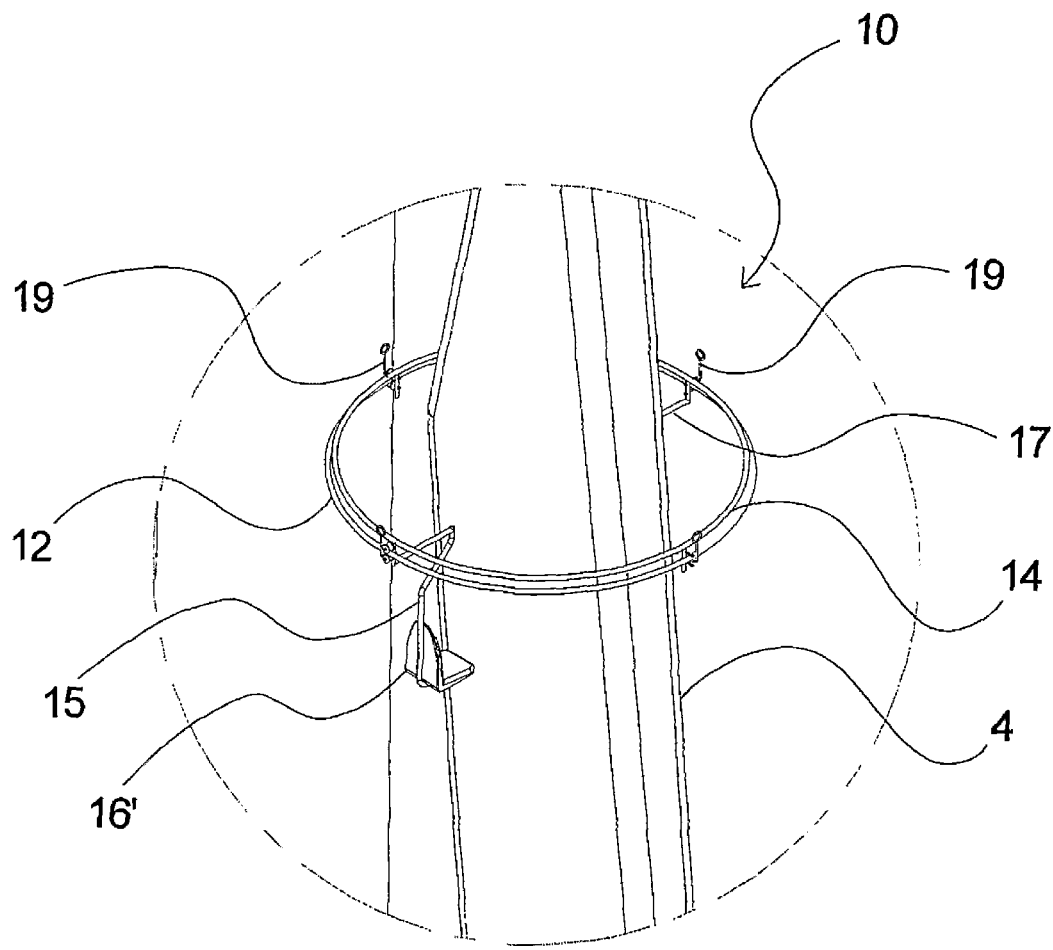
FIG. 2*b* shows corresponding to FIG. 2*a* another embodiment according to the invention.

FIG. 1 illustrates a wind turbine 1 having a tower 2, a nacelle 3 and three rotor blades 4. The wind turbine has been stopped with one of the rotor blades pointing essentially downwards and a service device 10 according to an embodiment of the invention has been hoisted up along the rotor blade 4. As it will be explained in further detail later on, the service device 10 is connected to anchoring means generally designated 20 by means of lines, wires etc. The anchoring means may be in the form of a locking device that grips a part of the wind turbine, e.g. the root of the rotor blade 4 or the tower 2. Further, such a locking device may be an integral part of and/or may be lifted to the desired level by means of an uplift device, e.g. comprising a part lighter than air. Such lifting and/or locking devices may be of the kind described in PCT/DK03/00577 (WO 2004/022970 A1). It will be understood that such a lighter-than-air device may be guided by means of wires 21 connected to the ground, to a vehicle or to a vessel. However, other means of anchoring and/or establishing and/or placing anchoring means may be used as well. In particular, further examples of such lifting and/or locking devices will be described further on.

The service device 10 will be explained in further detail with reference to FIG. 2a that shows an enlarged detailed view corresponding to FIG. 1. Thus, the anchoring/lifting device 20 is as indicated locked to the rotor blade 4 and carrying the service device 10 by means of wires or the like 18, for example three, four etc. such wires uniformly distributed around the circumference of the service device 10. The service device comprises essentially two main parts, e.g. a first main part 12 and a second main part 14.

The first main part 12 may as shown be in the form of a generally circular part that is suspended by the abovementioned wires 18 that may be attached to brackets 19. The first main part 12 may be constructed using tubes, rods etc. of aluminium, composite materials, plastic material, fibre reinforced materials etc. It will be understood that the first main part 12 can be lifted and/or lowered in relation to the anchoring means 20 and the rotor blade 4 by means of the wires or lines 18, e.g. by hoisting means (not shown). Such hoisting means may be placed at the device itself, e.g. at the first main part, whereby the device may hoist itself, e.g. climb up and down the wires, at the anchoring means or at the ground, e.g. at a vehicle or at a vessel, whereby the hoisting means will elevate the device by e.g. pulling the lines or wires.

The second main part 14 may have a form similar to the form of the first main part and may also be constructed using tubes, rods etc. The second mains part is connected to the first main part 12 in such a manner that the second main part 14 may be rotated in relation to the first main part 12. The two main parts may be connected to each other at suitable locations along the circumference, e.g. at locations corresponding to the locations of the brackets 19. Here, bearings may be arranged and further means of performing a rotational action, e.g. electric motors etc. may be arranged (not shown). The two main parts may thus be mutually rotated, preferably up to a full revolution. i.e. 360° or even more, possibly only limited by electric wires, cables etc. connecting the two parts.

Further, the second main part 14 suspends or carries an object such as a work tool for performing work operations, inspection etc. at a rotor blade or tower, a work platform 16, e.g. a basket, a cage, a stand etc. for carrying one or more persons that have to perform some sort of work at the wind turbine, e.g. inspection, cleaning, repair, surface treatment etc. This work platform 16 is suspended by means of an arrangement 15 allowing e.g. multidirectional displacement in relation to the second main part 14, as will be explained in further detail later on and whereby virtually any desired position may be taken by the platform 16, e.g. in relation to the rotor blade or another part of the wind turbine. Instead of a work platform 16, a work tool or another object may be carried by the second main part controlled to take any desired position in relation to the structure.

Further on, the second main part 14 suspends a counterweight body by means of a suspension arrangement 17, which will also be explained in further detail later on. However, the counterweight body is suspended and controlled in such a manner that it is moved in correspondence with the movements of the work platform, whereby a perfect balance is achieved.

FIG. 2b shows an enlarged detailed view corresponding to a further embodiment of the invention. This embodiment corresponds to the one described with reference to FIG. 2a, but instead of a work platform this embodiment comprises a seating or a chair 16' for one person only or possibly two or even more persons. It will be understood that such seating will comprise means for securing a person, e.g. seat belt(s) etc. and further means for controlling the position of the chair 16', e.g. a joy stick or similar means for controlling the vertical position, the position in relation to the rotor blade (the rotational position) and the distance to the rotor blade. As explained above, the device comprises a counterweight body suspended by means of an arrangement 17 that provides a balancing of the device.

Figures 2C, 2D:
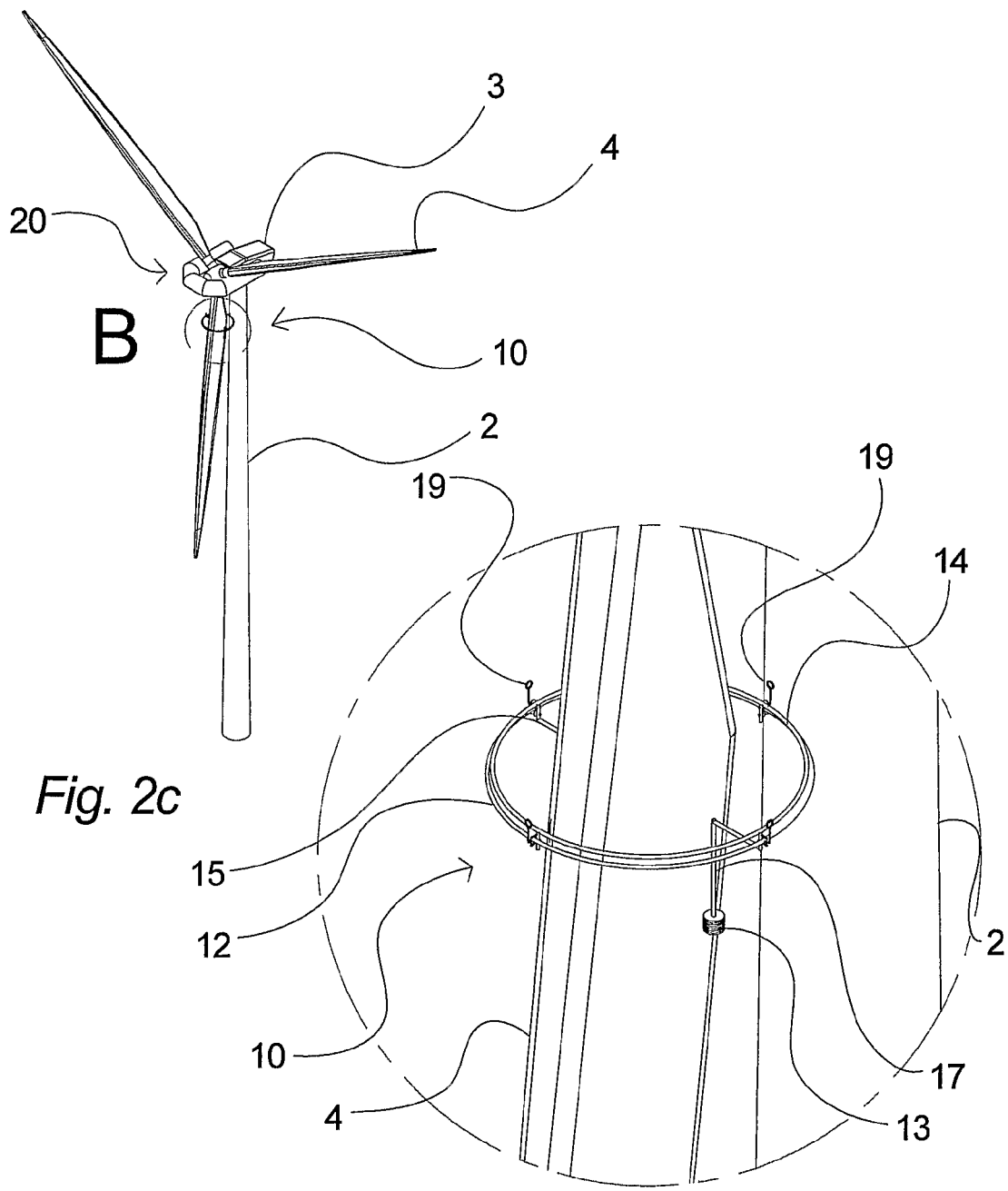
FIG. 2*c* illustrates corresponding to FIG. 1 a wind turbine with a device according to an embodiment of the invention seen from another angle.
FIG. 2*d* shows corresponding to FIG. 2*a* and 2*b* an embodiment of the device according to the invention.

FIG. 2c shows a wind turbine with a service device according to the invention corresponding to FIG. 1, but seen from another side. FIG. 2d shows similarly an enlarged detailed view seen from this angle, showing the abovementioned counterweight body 13 suspended by the arrangement 17 from the second main part 14.

Figure 3:
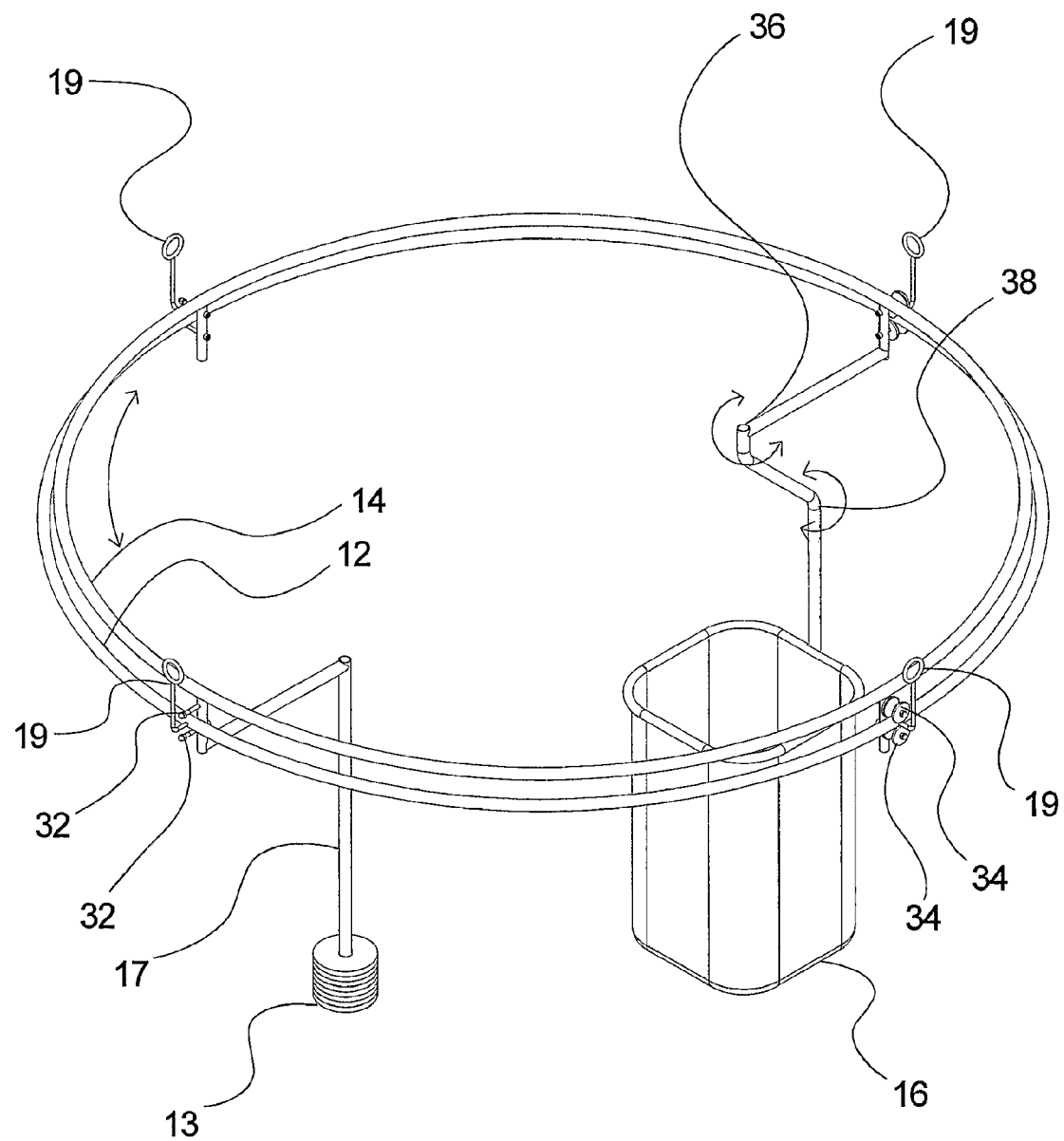
FIG. 3 is a device according to an embodiment of the invention in further detail.
Figure 4:
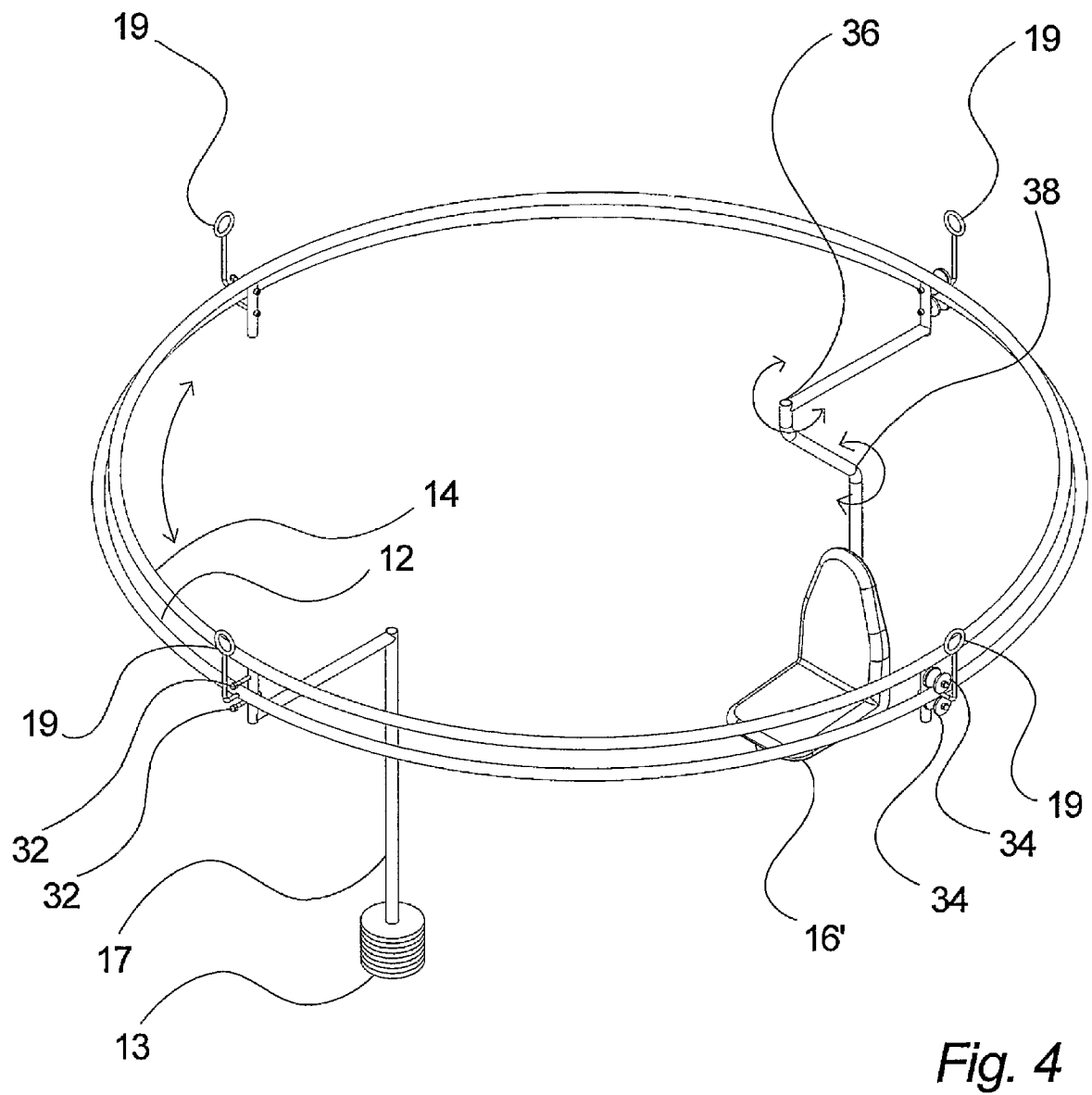
FIG. 4 shows another embodiment of the device according to the invention.

FIGS. 3 and 4 show in more detail and in schematic manner service devices according to further embodiments of the invention, the device shown in FIG. 3 comprising a work platform as described above with reference to FIG. 2a and the device shown in FIG. 4 comprising a seating arrangement as described above with reference to FIG. 2b. Apart from this the two illustrated devices are similar.

The first 12 and the second 14 main parts are illustrated as similar essentially circular parts, but it will be understood that other forms may be utilized. The first main part 12 is situated below the second main part 14 and is designed with a number, e.g. four, of brackets 19 for suspending the device from an anchoring means placed on a wind turbine. The brackets 19 may be means for attaching wires (not shown) etc.

The second main part 14 comprises a number of means for suspending this part in relation to the first part 12. Four of these means are utilized in FIGS. 3 and 4, but it will be understood that other numbers may be utilized, e.g. two, three, five, etc. These means may as illustrated comprise e.g. a number of bolts 32 connected to the second main part, each one carrying wheels or similar means 34 having an outer shape corresponding to the shape of (a part of) the first main part 12. In this manner the two main parts will be connected to each other in a secure manner while still allowing mutual rotational movement that may be up to 360° or more. It will be understood that driving means (not shown) may be connected to one or more of the wheels whereby the rotational action can be made available. Further, it will be understood that the two main parts 12 and 14 may be located differently in relation to each other, e.g. located in the same vertical level or the second part below the first part.

The work platform 16 is as described above suspended by a suspension arrangement 15 that is connected to the second main part, e.g. at the same location as one of the set of wheels 34 or at another location. This suspension arrangement 15 is able to adjust the location of the platform, e.g. by providing rotational movement at a link 36 and/or at a link 38, controlled by suitable control means such as e.g. handles, levers, switches, a joystick or the like (not shown) placed at the work platform 16. Further it will be understood that the suspension arrangement 17 for the counterweight 13 may be configured in a similar manner and/or with a less degree of manoeuvrability as illustrated.

It will also be understood that the suspension arrangements 15 and 17 may be configured in numerous manners which will be obvious to a person skilled in the art, e.g. using rotational joints, telescopic joints etc.

FIGS. 5 to 8 illustrate further uses of a service device according to the invention and in particular different manners of providing anchoring for a device according to the invention.

Figures 5, 6:
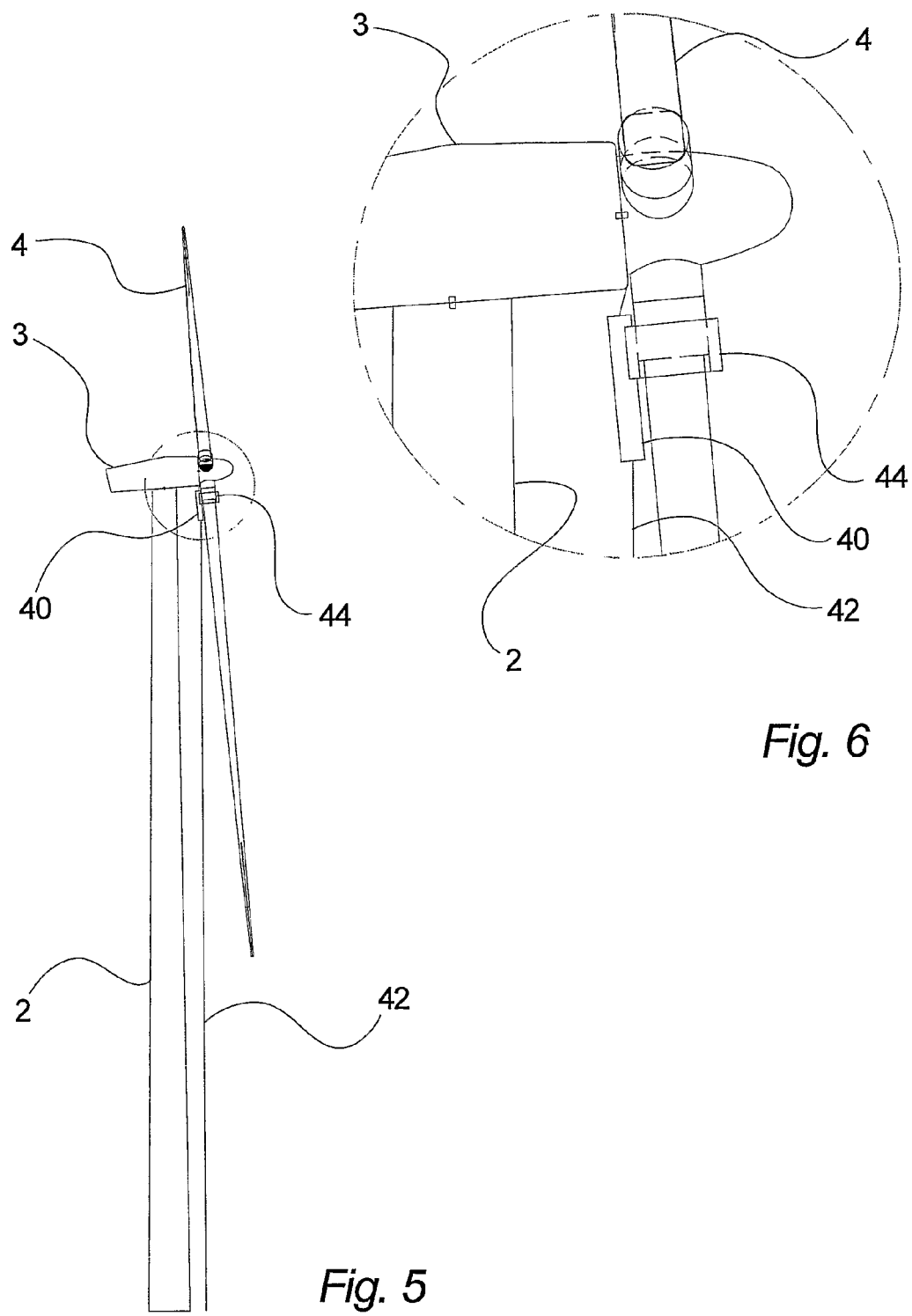
FIG. 5 shows a wind turbine from the side with anchoring means in accordance with a further embodiment of the invention.
FIG. 6 shows in a larger scale part of FIG. 5 showing the anchoring means in a detailed view.
Figures 7, 8:
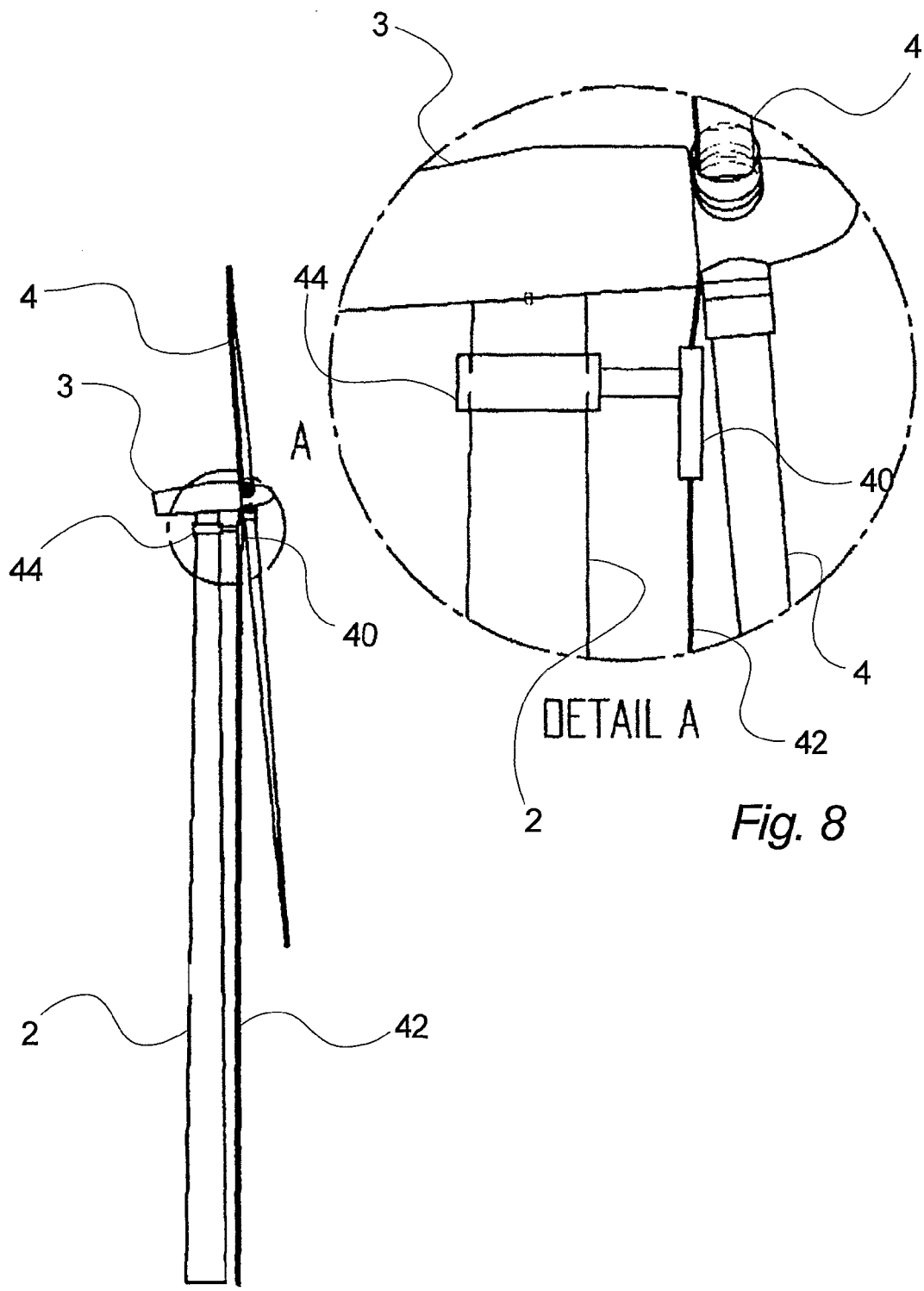
FIG. 7 shows corresponding to FIG. 5 anchoring means for anchoring at the tower.
FIG. 8 shows in a larger scale part of FIG. 7 showing the anchoring means in a detailed view.

FIG. 5 shows a wind turbine 1 with tower 2, nacelle 3 and rotor blades 4. A wire or the like 42 is attached to a part of the wind turbine at the top, e.g. extending from the rotor hub, the nacelle 3 or from another part in this area as it is shown in an enlarged view in FIG. 6. This wire that may be lowered from the e.g. nacelle or that is hoisted and connected to the e.g. nacelle, serves to bring an anchoring means 44 to the top of the wind turbine 1. This may for example take place by having a carrier device 40 that carries the anchoring means 44 climb the wire 42 or by having the carrier device being hoisted by the wire 42. When the carrier device 40 is at a desired level, the anchoring means is brought to grip and/or establish an anchoring at the wind turbine. As shown in FIGS. 5 and 6 the anchoring means 44 may establish anchoring at a rotor blade 4, or as shown in FIGS. 7 and 8 the anchoring means 44 may establish anchoring at the tower of the wind turbine 1. In both cases the anchoring means 44 may serve as anchoring for a service device or the like as described above, e.g. for allowing access to any part of a wind turbine e.g. a rotor blade or the tower, at any place, e.g. at any level and/or at any circumferential spot.

A still further embodiment of a service device 50 in accordance with the invention will be described with reference to FIG. 9, wherein such a device is shown in a perspective view. Here, the first main part is generally designated 62 and comprises end parts 71 and 72 and side parts 73 and 74, which parts are connected to each other at connection points, e.g. 75. These connections 75 are releasable and possibly also adjustable. The connections may be in the form of screw-connections or the like or in the form of snap-action connections or other forms of quickly releasable connections. The end parts 71 and 72 may be essentially semicircular in shape and the side parts 73 and 74 may be essentially linear elements. In this manner the first main part 62 may take an elongated shape, e.g. an oval-shape or the like, e.g. suitable for work on a rotor blade of a wind turbine. The size may be adjusted, e.g. by using side parts of different lengths and/or end parts of different widths. As shown, these parts may comprise tubular elements, e.g. one at the bottom and one at the top, and reinforcing plate material between these tubular elements.

Figure 9:
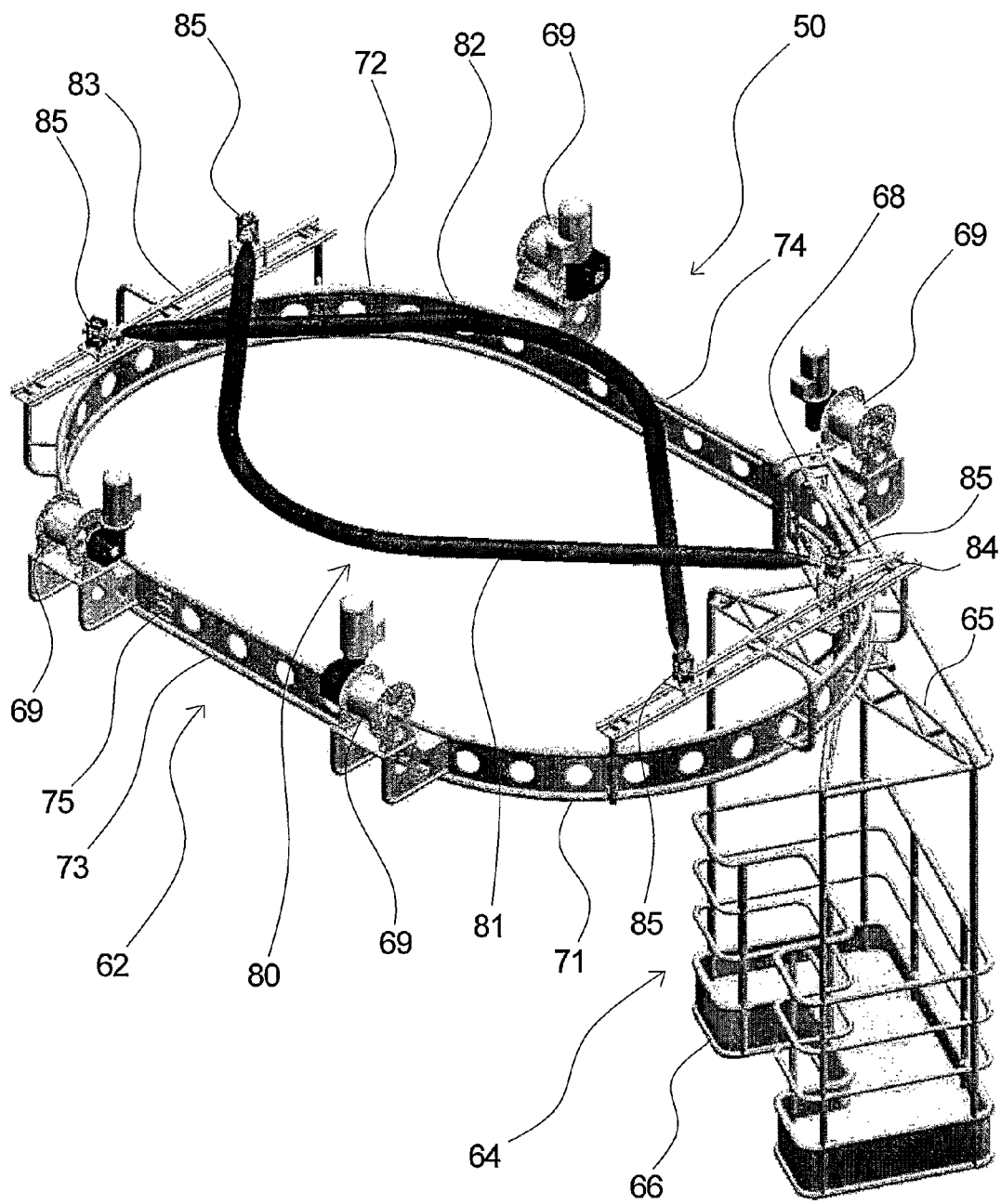
FIG. 9 shows a still further embodiment of a service device in accordance with the invention in a perspective view.

As explained above, the first main part may comprise hoisting means which in FIG. 9 are shown as four hoisting means 69, two located at each side of each of the end parts 71 and 72. These hoisting means 69, which may be driven by electric motors or other suitable means, are connected to wires or the like (not shown in FIG. 9) that are connected to anchoring means 20 e.g. near the hub of the wind turbine as explained above, whereby the service device 50 may be lowered or lifted.

In correspondence with what has been described in connection with other embodiments of the invention the service device 50 comprises a second main part 64 comprising an object such as a tool or a work platform 66 that is suspended by a suspension arrangement 65 that is connected to movable suspension means 68. These movable suspension means 68 can travel along the first main part 62, e.g. riding on the rail shaped or tubular elements of the parts 71, 72, 73 and 74, preferably driven by electric motors or the like. As also explained above, the service device 50 may comprise a counterweight part (not shown in FIG. 9) that may be designed with parts corresponding to the parts 65 and 68. It will be understood that the counterweight part and the work platform need not be mechanically connected but may be controlled in such a manner that they will be located opposite each other when the device 50 is used. The counterweight part may serve to carry necessary equipment such as batteries or other power supply means, compressors, etc.

Further, the service device 50 shown in FIG. 9 comprises a securing and/or stabilizing arrangement 80 which may serve to stabilize and possibly also secure the device 50 when it is located at a specific height where work is to be done. For this purpose the arrangement 80 comprises two flexible securing elements 81 and 82 that may be elements known in the art as flexible muscles, e.g. tubular elements that may be inflated by compressed air in which case they expand and simultaneously reduce their length. As shown these elements 81 and 82 are connected to securing beams 83 and 84 that are located on each of the end parts 71 and 72. The securing elements 81 and 82 are located at the beams 83 and 84 by means of fixation means 85 in such a manner that the position may be adjusted, e.g. transversely, and fixed. In a non-activated state these elements 81 and 82 may cross each other as shown in FIG. 9, thereby allowing a structure such as e.g. a rotor blade to pass between the elements. The securing elements 81 and 82 are as described above connected to fixation means 85 that may also serve as means for leading compressed air to and/or from the securing elements. Further, the securing elements 81 and 82 may be connected to the fixation means 85 in such a manner that the securing elements 81 and 82 may rotate while maintaining airtightness. The securing elements 81 and 82 may be filled with air by means of e.g. one or more electrically driven compressors. Air may be pumped to and/or released from the securing elements separately, e.g. the pressure in each of the securing elements may be controlled. It will be understood that these securing elements 81 and 82 may be provided in different lengths, corresponding to e.g. the different lengths of the side parts 73 and 74.

When using this service device 50, e.g. in connection with a rotor blade of a wind turbine, the hoisting means 69 are connected to anchoring means located near or at the rotor of the rotor blade by means of wires or the like (not shown), and the height of the device 50 is adjusted by means of the hoisting means 69, e.g. controlled by a person situated e.g. at the ground, in the work platform 66 etc. and by means of suitable control means (not shown) such as a joystick etc. When the desired height is reached, the hoisting means 69 are stopped. As it is commonly known, brakes may be activated for holding the device e.g. brakes integrated with the electric motors, or the hoisting means may be equipped with self-locking gear means, worm gear wheels etc.

For stabilizing the device in relation to e.g. a rotor blade, and possibly for further securing the device, the securing arrangement 80 may now be activated, which is done by means of compressed air led to the securing elements 81 and 82 via the fixation means 85. These means may as described above be connected to compressor means that fill the securing elements, e.g. flexible muscles with air, whereby they will contract in length and expand in width. Thus, the securing elements 81 and 82 will press against and clamp the e.g. rotor blade. The service device 50 will in this manner be positioned firmly in relation to the e.g. rotor blade and will not tend to move under the influence of the wind etc. Further, since the air pressure and/or the volume of air contained in each securing element can be controlled individually, the position of the service device and thus also the position of e.g. the work platform can be adjusted in this manner. For example, if an additional amount of air is led to the securing element 81 shown in FIG. 9 and/or air is released from the securing element 82, the service device will be moved to the right in relation to e.g. a rotor blade gripped by the securing elements, and vice versa.

Figure 10:
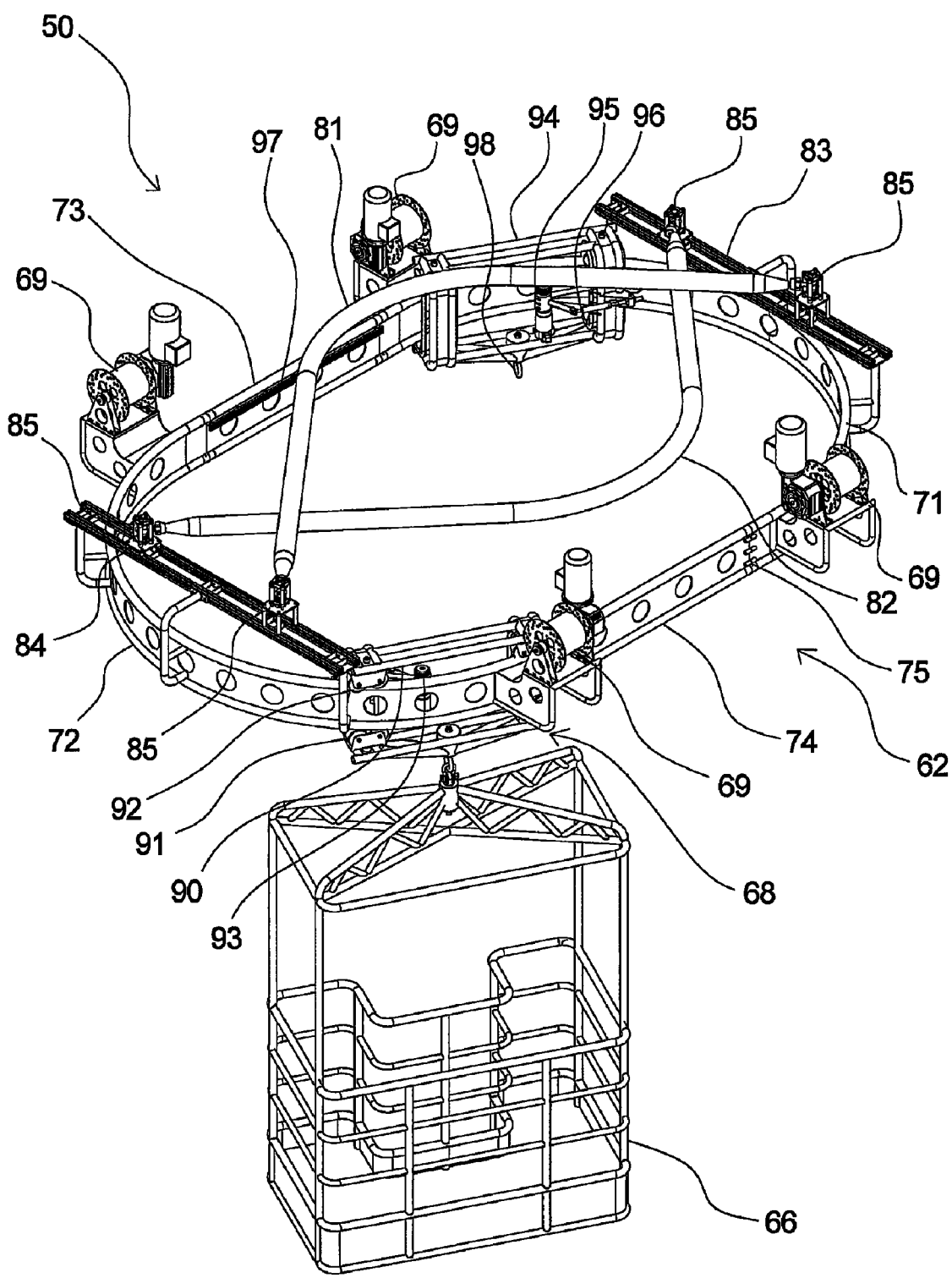
FIG. 10 shows a service device as illustrated in FIG. 9, but seen from another angle.

FIG. 10 shows a service device as illustrated in FIG. 9, but seen from another angle. Thus, the same reference signs are used for the same elements and features and will not be described again here. However, here it is more clearly shown that an object such as a work platform 66 is suspended from movable suspension means 68, and that these means comprises a frame 90 having a lover set of guiding wheels 91 and an upper set of guiding wheels 92 located at each end. The frame 90 is located on the inside of the first main part in the illustrated example in order to be able to pass the fastening means for the securing beams 83 and 84 and the mounting means for the hoisting means 69. The guiding wheels 91 and 92 are designed for riding on the edges, e.g. the tubes of the first main part, and it will be understood that these wheels are located in such a manner that they may be turned at least a small angle in relation to the frame 90 in order to be able to pass the curved parts of the first main part, e.g. the end parts 71 and 72. Further, this frame 90 is equipped with a drive motor 93 for moving the frame 90 along the first main part. The features relating to this drive motor will be further explained in connection with a similar movable suspension means located opposite the first one. This comprises a similar frame 94 for carrying a counterweight (not shown), e.g. by means of attachment means such as a hook, a ring or the like 98, which counterweight may comprise a battery power source etc. This frame 94 comprises similar wheels etc as described in connection with the frame 90 and a drive motor 95. This has driving means in the form of e.g. a toothed wheel for interaction with e.g. a toothed rack 97 located on the inside of the first main part. In FIG. 10 this is only shown on the part 73, but it is clear that it will be located all along the first main part. An engagement link 96 serves to bring the drive engine 95 into contact with the e.g. toothed rack 97 on the first main part. The frame 90 may naturally be provided with a similar arrangement.

As previously described, the two parts, e.g. the frame 90 and the frame 94, of the second main part will be located diametrically opposite each other and will thus also be moved synchronously. They may be connected mechanically as previously described, e.g. where they were placed on a common frame. In the embodiment shown in FIG. 10, they may also be mechanically coupled, for example by means of cables, wires etc. They may especially be coupled via one or more additional movable means (not shown) located on the first main part, e.g. movable means comprising upper and lower guiding wheels, in which case a connection between the two frames 90 and 94 may be established by having a rod or the like connecting the frame 90 with a first additional movable means, by having a similar rod connecting the first additional movable means with a second additional movable means, that again is connected to the frame 94 by means of a rod or the like. It will be understood that one, two three or more of such additional movable means may be utilized, and that in this manner the two parts, e.g. the frames 90 and 94, will be moved along the first main part in synchronicity. It will also be understood that when a mechanical connection is involved, one drive motor will suffice. However, instead of using a mechanical arrangement, the two parts may be controlled e.g. electronically to move in synchronicity, which will be evident to the skilled person. For example, the drive motors may be step motors and/or servo motors, a wireless communication may be established between the two parts etc.

In connection with FIG. 10 it is also noted that the two securing elements 81 and 82, when not activated, e.g. filled with air, may tend to fall downwards, meaning that it may be difficult to introduce a rotor blade in the device and in between the to elements 81 and 82, e.g. to lift the device 50 up on the rotor blade. In order to relieve this, support means may be located on the first main part, e.g. at the part 74 for the securing element 82 and on the part 73 for the securing element 81. Instead special means may be located in the securing elements 81 and 82 for maintaining a proper location. Such means may for example be telescopic flexible rods that stretch from one fixation element 85 on the securing beam 84 and to a fixation element 85 on the securing beam 83 inside the tubular elements 81 and 82.

As it has been described previously, the securing elements 81 and 82 are rotatably mounted at the fixation means 85. Thus, when the securing means have been activated and press against the surface of e.g. a rotor blade, the service device may be lifted and/or lowered without deactivating the securing elements, since these will roll along the surface.

Further, it is noted that the service device 50 may be equipped with wheels or similar elements for supporting against the surface of e.g. a rotor blade. These may also serve to support the device 50 against e.g. a rotor blade or a wind turbine tower when it is lifted and/or lowered.

Figure 11:
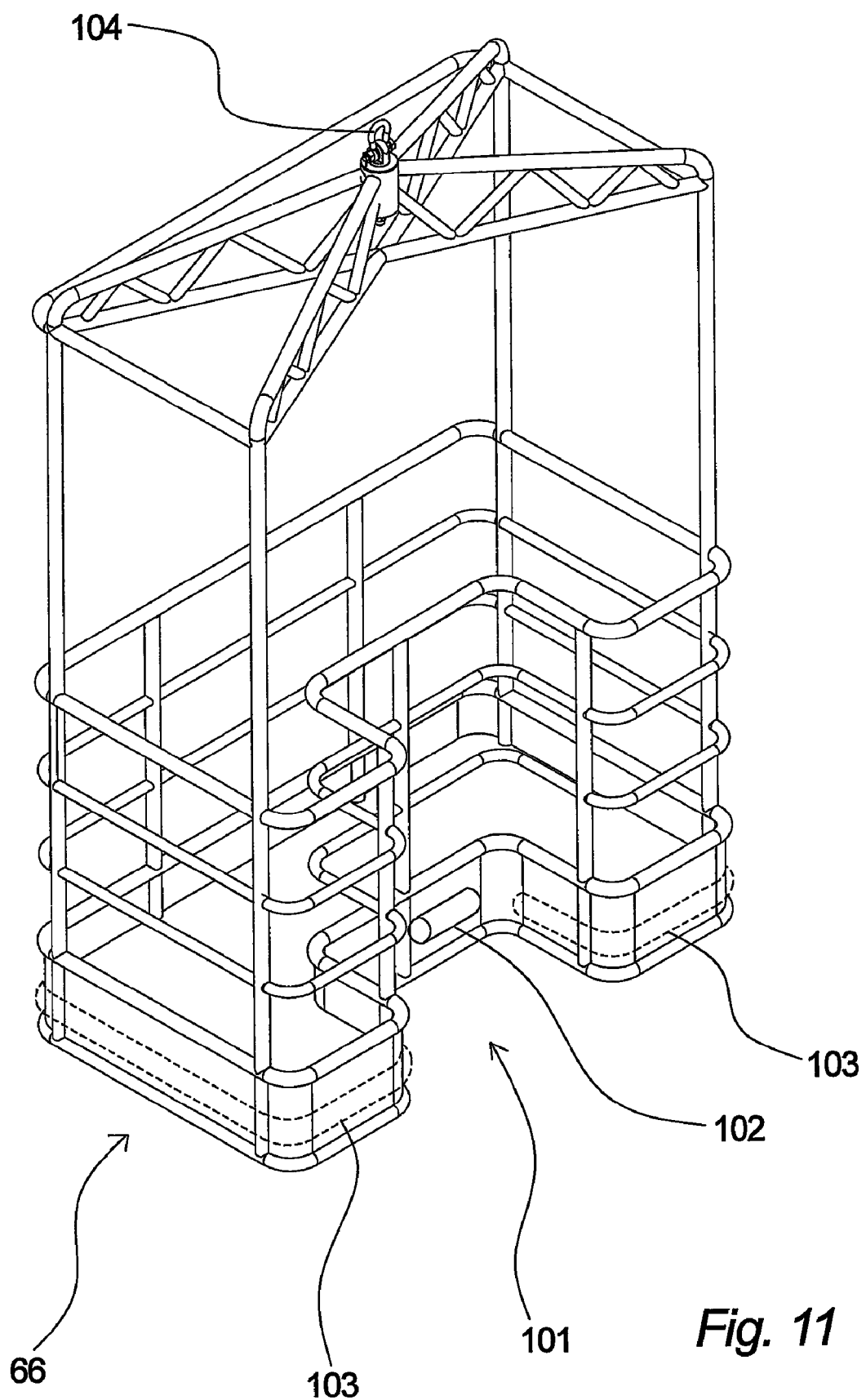
FIG. 11 shows a work platform for use in connection with for example a service device as shown in FIGS. 9 and 10.

In FIG. 11 a work platform 66 is shown in an enlarged view. This may be designed in lightweight material such as aluminium tubing and may have a size suitable for one person or two persons. Larger platforms may be available. As shown the platform is designed with a central vertical indentation or notch 101 in the guardrail which may serve to accommodate the edge of a rotor blade when the service device with the platform 66 is being lifted or lowered. For this purpose the platform 66 is provided with protection means, e.g. in the form of a roller or the like 102 situated in the indentation 101 as schematically indicated in FIG. 11. This roller 102 will contact the edge of the rotor blade and roll along this during lifting and lowering and will thus prevent harmful contact. More than one roller may be provided. Further, the platform 66 is equipped with further protection means for protection against harmful contact between the platform and e.g. a rotor blade when working on a rotor blade. Such protection means may for example be in the form of a protection strip as indicated at 103. Such a strip may for example comprise foam material, rubber material or any other suitable materials. Further, air-filled tubing may be utilized. Even though only one strip 103 has been indicated, more than one may be provided. Preferably, such a strip will be placed near the bottom and on all sides of the platform 66.

The platform may be suspended by a hook, a ring 104 or the like from e.g. a device as shown in FIG. 10 in such a manner that it may be freely rotated, e.g. by hand. Also, it may be rotated by power means, for example controlled by a person in the platform. The platform will be equipped with control means (not shown) comprising means for lifting and lowering the device, e.g. for controlling the hoisting means 69 (FIGS. 9 and 10), and for controlling the position along the circumference of the rotor blade e.g. by controlling the drive motor 93 or 95 (FIG. 10). Further, means for controlling the securing elements 81 and 82 are also present. The control means may comprise a joystick and/or other suitable control input means and may be used for controlling the service device as well as the platform itself, e.g. the positions of these. Further, it is noted that individual means may be controlled, if necessary, for example may the hoisting means 69 be controlled individually, e.g. in order to control the inclination of the device, which may be necessary since the edge of a rotor blade of a wind turbine in many cases may incline in relation to the vertical direction when parked for service. It is also noted that the device or the platform may be equipped with a gyro arrangement e.g. in order to maintain a predetermined inclination, angular position etc.

Finally it should be mentioned in relation to the platform shown in FIG. 11 that it may be designed in order to protect a person against the wind, rain etc. e.g. by having a covering of the top, which will preferably be a transparent material such as Plexiglas or a similar material, and by having coverings or shielding for the sides which may be in the form of roller curtains or the like. Also it is noted that the platform and/or the service devise is equipped with illumination means, lighting means etc. in order to allow the platform and/or the service device to be used also when daylight is not present. The platform may be provided with a small winch or the like lifting and/or lowering necessary items, tools, spare parts, etc. It will thus not be necessary to bring the platform and the service device down to the ground when such parts are needed.

Figure 12:
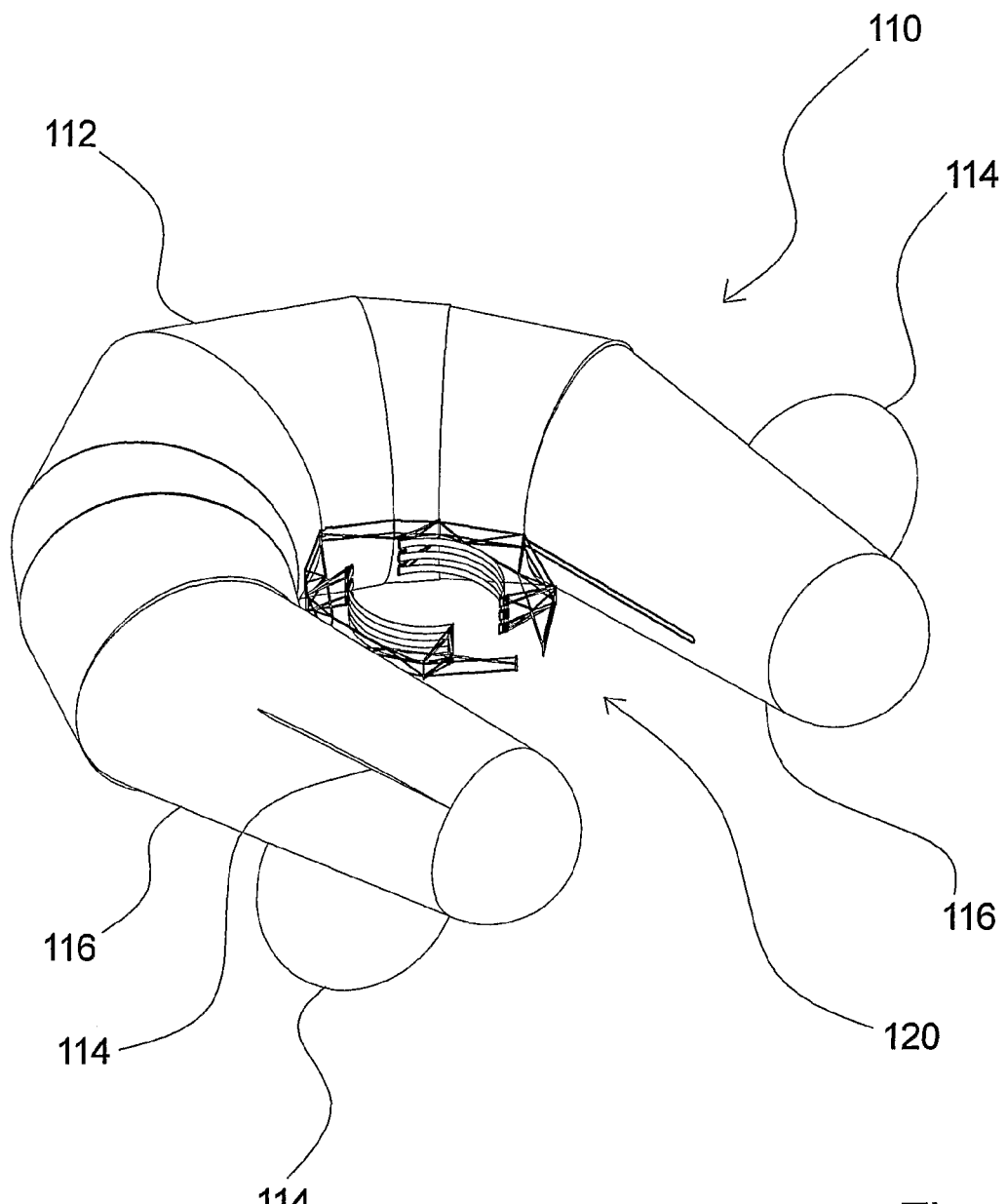
FIG. 12 shows a device for establishing an anchoring at a wind turbine.

A device 110 for establishing an anchoring at a wind turbine, e.g. at a rotor blade, at a tower etc., for example for use in connection with a service device as described above or in connection with other devices, is shown in FIG. 12. This device 110 is designed in analogy with the devices disclosed in PCT/DK2003/000577 (WO 2004/022970 A1), and reference is made to this publication for further details and information. However, the device 110 shown in FIG. 12 involves a number of particular important features which will be described in further detail in the following.

The device 110 comprises an uplift device 112 and a locking device generally designated 120. The uplift device 112 is substantially U-shaped or shaped like a horseshoe. It thus comprises a pair of legs 116 and may comprise a number of separate uplift elements or may be formed as a single element. These elements can be flexible chambers filled with a gas, for example helium, which is lighter than the atmospheric air. These elements can be separated, but can also form a continuous chamber. Further, the uplift device 112 may as indicated comprise a number of vanes 114 placed at the legs 116 for adding e.g. stability and directional control and for using the wind as a supporting factor. As also described in the above-mentioned WO 2004/022970 A1 the device 110 may be located at a wind turbine, the uplift device can be filled with e.g. helium in a sufficient amount to allow the device to lift itself up to the tip of a rotor blade and further up along this or up along a tower. At a suitable position, for example at the root of the rotor blade or at the top of the tower, the locking device 120 will be activated to grip around the respective part of the wind turbine. Hereafter an object such as e.g. a service device as described above may be hoisted up, e.g. by means of wires etc. and the hoisting means 69, or another object may be lifted and put to use while being suspended by the locking device 120.

The locking device according to this embodiment will be further described with reference to FIG. 13, wherein the frame and other particular components of the locking device 120 is shown in an enlarged view, and with reference to FIG. 14, wherein a clamping element 140 is shown in an enlarged view.

The locking device 120 comprises two frame parts 122 and 124 that are made for example of tubing or rods of lightweight material such as e.g. aluminium. These frame parts are joined at one end by means of a hinge joint 126 that allows the frame to be opened up. At the other end the frame parts 122 and 124 comprise extension parts 127 and 128, respectively, for cooperation with the clamping element 140. Further, the frame parts 122 and 124 comprise support parts 123 and 125, respectively, for the legs 116 of the uplift device 112. As described in the above-mentioned WO 2004/022970 A1 the locking element is designed to grip an object located in the interior space 130, e.g. rotor blade or a tower of a wind turbine. This is done by means of at least two clamping parts. These clamping parts are constituted by a number of flexible clamping means 132 and 134, e.g. three at each side as shown, although it will be understood that more or less than three may be used. The clamping means 134 are supported by arms 135 and the clamping means 132 are similarly supported by arms 133.

The clamping means 132 and 134 can be configured from a flexible material so that these adapt themselves to the surface of the rotor blade, e.g. the root of the rotor blade or a tower. Thus they may also adapt themselves to other shapes than circular shapes, e.g. elliptical shapes, elongated shapes, shapes comprising linear parts joined at angles etc. That side of the clamping means 132 and 134 which faces towards the e.g. rotor blade or the tower can be configured with a surface which in structure and/or material ensures a good friction to the rotor blade. It can thus be a surface coating of a rubber material or similar materials known within the art, which, for example, can also have a pattern, grooves, projections or the like on the surface to provide a good grip without harming the surface.

Figure 14:
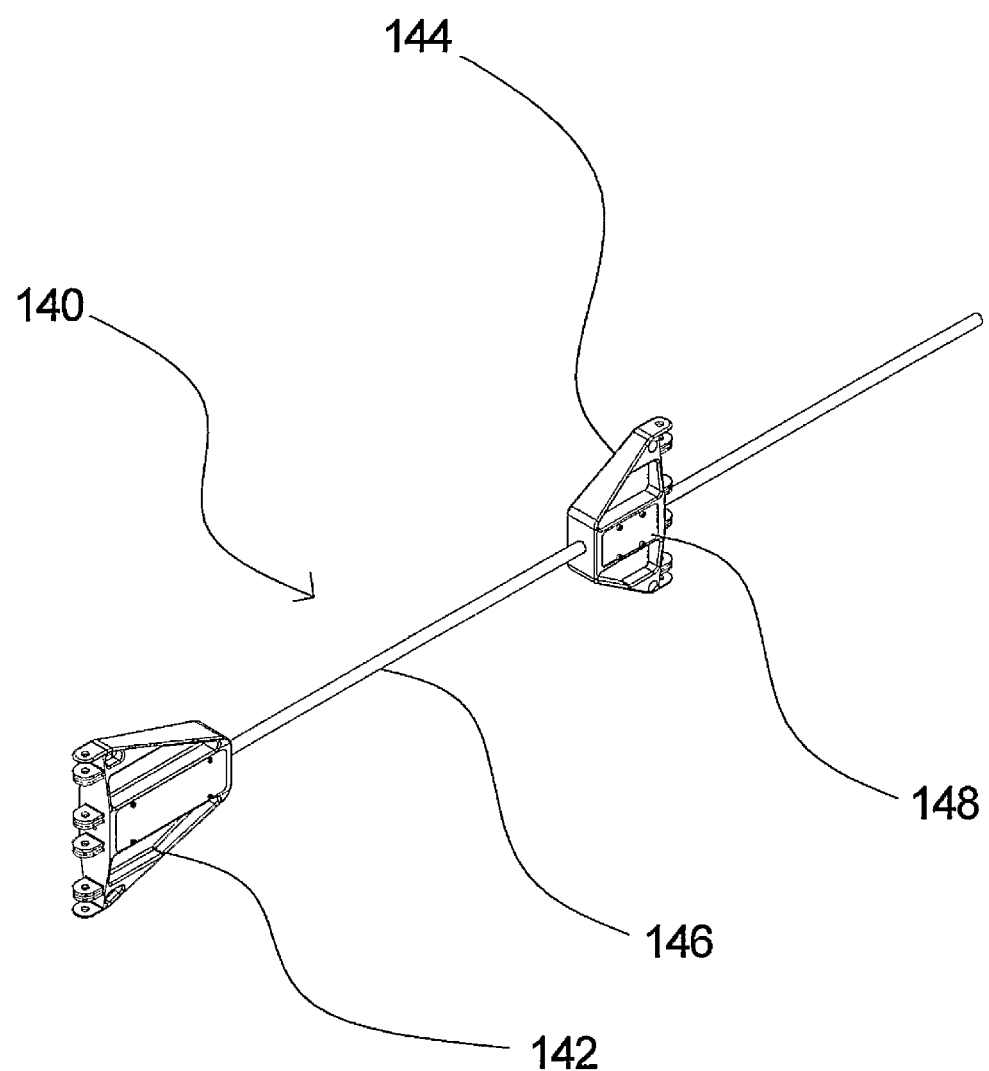
FIG. 14 shows a clamping element for use in connection with the locking element shown in FIG. 13.

The clamping element 140 shown in FIG. 14 comprises two end parts 142 and 144, which can be connected to the extension parts 127 and 128, respectively, and an activating rod 146, e.g. a threaded rod, which is rotatably fixed at the end part 142 and is connected to a gear motor 148 located at the end part 144. It will thus be understood that when the gear motor, which preferably is wirelessly controlled, is activated, the two frame parts 122 and 124 may be opened up or brought closer together.

Further, it is noted that at each end of the clamping means 132 and 134, e.g. at the arms 133 and 135, means 138 for enhancing the clamping function is provided, e.g. in the form of tackles etc. that is connected by means of wires, lines etc. (not shown in FIG. 13) similarly to what is described in the above-mentioned WO 2004/022970 A1.

The functioning of the locking device 120 will now be explained. It will be understood that the locking device may initially be dismantled e.g. for transport, but may quickly be assembled. The uplift element is connected to the frame parts, e.g. with the leg parts 116 to the support parts 123 and 125 and the other interior parts connected to the frame parts 122 and 124 as shown in FIG. 12. This may be done using means connected to the material of the uplift device, e.g. reinforcing material, string means, zipper means etc. Lines, wires etc. may be placed on the means 138 for enhancing the clamping function, whereby a number of lines, e.g. four, will remain and extend downwards. Further, the clamping element 140 may be placed at the locking device, preferably in a state where the two frame parts 122 and 124 are opened up, removed a suitable distance from each other.

The uplift device may now be filled with e.g. helium, whereby the device 110 comprising the uplift device 112 and the locking device 120 will be lifted up along the e.g. rotor blade or the tower, possibly additionally controlled by one or more lines or wires extending down to the ground. When the desired height is reached, the clamping element 140 is activated, whereby the two frame parts 122 and 124 will be brought closer together, and whereby the locking device will be closed around the relevant part, until the clamping means 133 and 134 is in close proximity of the surface and possibly contacting this. It will be understood that the clamping element 140 does not provide the clamping effect for securing the anchoring. This will be provided by the means 138 for enhancing the clamping function in analogy with what has been disclosed in the above-mentioned WO 2004/022970 A1. It will thus be understood that the above-mentioned lines, e.g. four lines, extending down from the means 138 may be connected to an object that is to be lifted up, e.g. the service device 50. When for example the hoisting means 69 lift the service device upwards the pull in the lines provided by the weight of the service device will force the clamping means 133 and 134 closer together, thereby enhancing the grip around the e.g. rotor blade or the tower.

It will similarly be understood that when an object has been lowered completely to the ground, the grip on the wind turbine or rotor blade will be loosened, and the clamping element 140 can be controlled to open the frame again, whereafter the device may be brought downwards.

Figure 13:
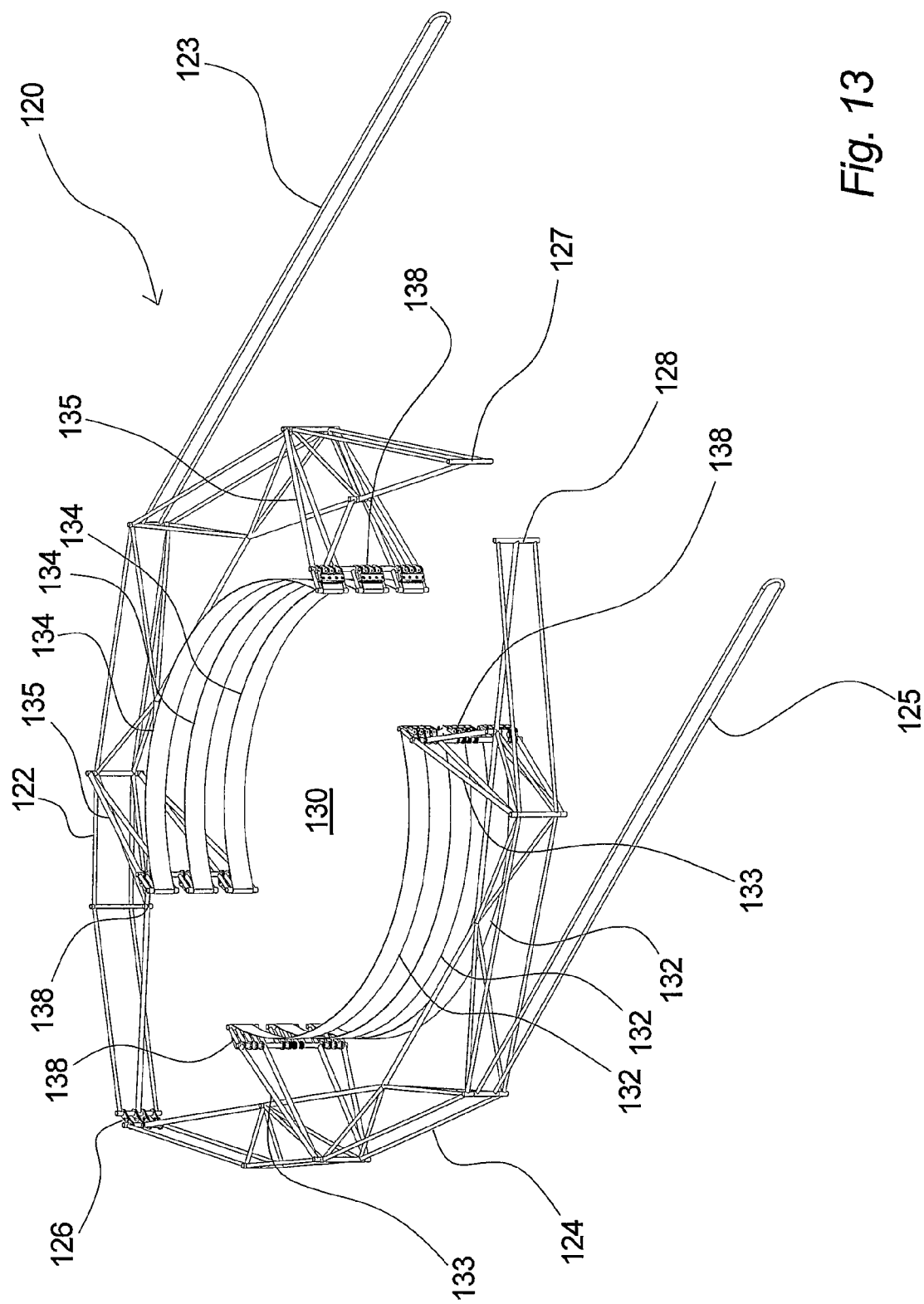
FIG. 13 shows a locking device in accordance with a further embodiment of the invention.

In connection with FIGS. 12 and 13 the locking device has been illustrated in combination with an uplift device, e.g. a device lighter than air for lifting the locking device. However, the locking device shown in FIG. 13 may also be used as described in connection with FIGS. 5 to 8, where a carrier device 40 is used for lifting and lowering the anchoring means 44. The locking device 120 shown in FIG. 13 may be such anchoring means that may be lowered and lifted by means of a line or wire extending down from the wind turbine.

Figure 15:
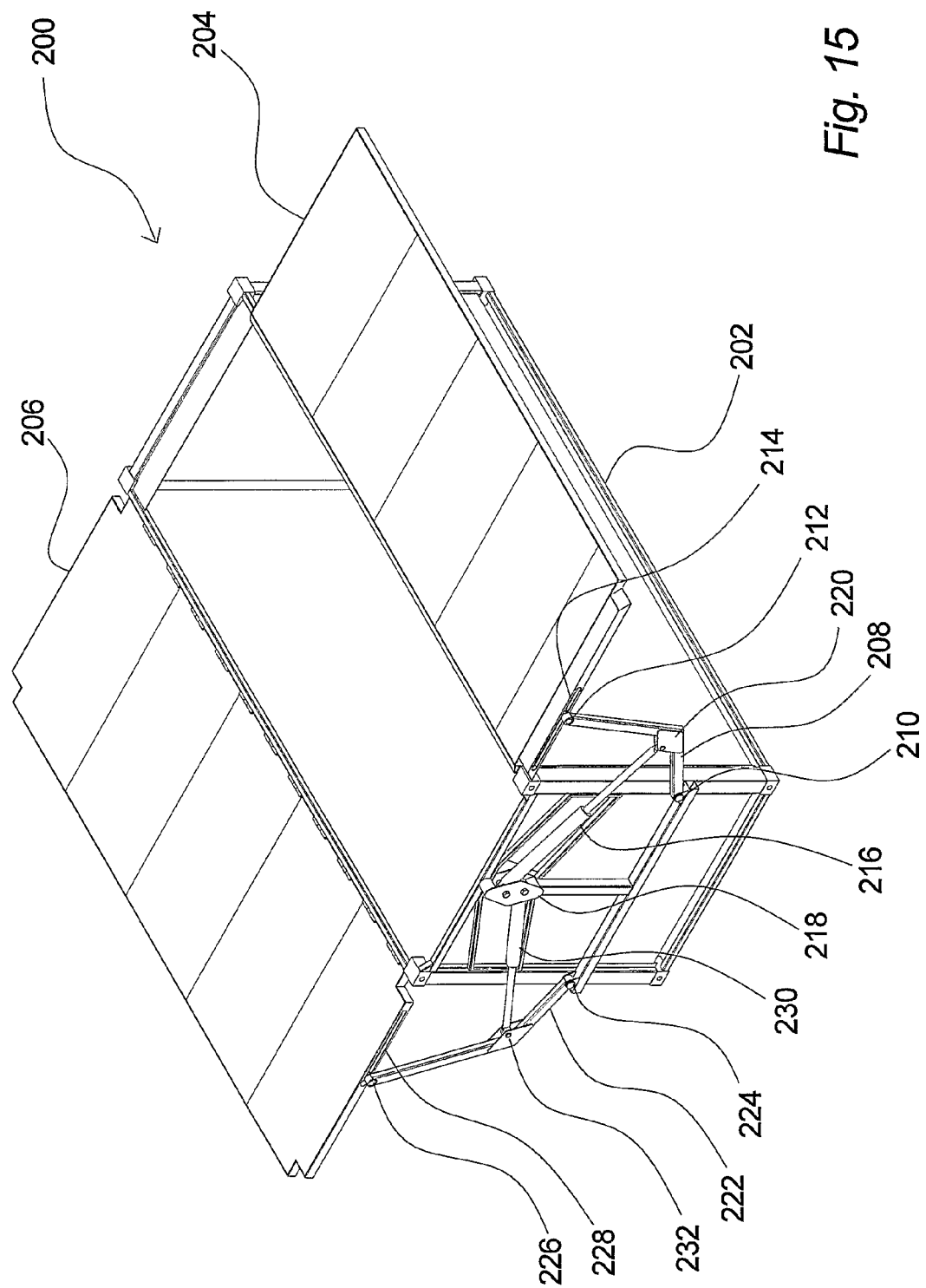
FIG. 15 shows a unit for transport and/or storage of means for performing work at for example a wind turbine.

In FIG. 15 is shown a unit 200 for transport and/or storage of means for performing work at e.g. a wind turbine, e.g. an uplift device and a locking device. Such a unit 200 comprises a container 202, which may serve to accommodate the respective devices, tools etc. and the necessary equipment such as for example an electrical generator, a compressor, communication and control means, tanks for e.g. helium etc. (not shown in FIG. 15). Such a container 202 may be placed and transported on a vehicle, on a lorry, on a vessel such as a small ship or a barge and may be brought directly to a wind turbine and placed e.g. near the tower when work, e.g. service work has to be performed. The unit is as shown provided with two lids or flaps 204 and 206 at the top, by means of which the top of the container may be opened completely. Each of these flaps 204 and 206 corresponds essentially to the size of the top of the container and it will thus be understood that when the top is closed, the two flaps or lids will be placed one above the other.

The flaps or lids 204 and 206 are as shown connected to the sides of the container 202 by means of hinges and the unit is opened by means of an arrangement that will be described in the following. The flaps 204 and 206 are opened by means of arms 208 and 222, respectively, that are hinged at one end 210 and 224, respectively, to the container, and at the other end 212 and 226, respectively, are slidingly connected to rectilinear guiding means 214 and 228, respectively, at the edges of the flaps. The arms 208 and 222 are moved by means of actuators 216 and 230, respectively, e.g. pneumatic or hydraulic actuators, which are connected to the container at a common fixing point 218 and at their other ends are connected to intermediate points, e.g. bends 220 and 232, respectively, of the arms 208 and 222. It will be seen that by this arrangement the lids or flaps may be opened and closed by activating the actuators 216 and 230, although they must be activated sequentially. When the flaps are opened, they will extend from the container 202 in a horizontal direction. The advantage of this will be explained in the following.

As described above, the unit 200 may be brought directly to a wind turbine, e.g. by a vessel or a vehicle, and may be placed here, e.g. directly underneath a rotor blade. The container may be opened as explained above (it will be understood, though, that doors will normally also be present in the side and/or in the end of the container), and the flaps 204 and 206 may now be used as workspace and support for the devices used. For example, when an uplift device is used, this may be taken up and unfolded on the flaps, e.g. with the legs placed extending in the longitudinal direction of the flaps. The locking device may now be taken up and assembled, if necessary, and it may be connected to the uplift device. The uplift device may now be filled with air e.g. helium, from tanks placed in the container and by means of a compressor placed in the container. When filled, the uplift device may be allowed to lift itself and a locking device and/or other means, up along the tower or the rotor blade, possibly additionally controlled by means of lines or wires anchored on the ground, on the container, on a vessel etc.

Further, if a service device or another tool device has to be lifted up, e.g. by using the locking device as anchoring means, such a device, that may also be stored in the unit, may also be assembled on the top of the container and lifted from here.

When the work has been completed, the devices used and in particular the uplift device may be brought down, the helium may be pumped back into tanks, the devices may be disassembled and/or folded and stored in the unit 200.

During the operations the necessary electric energy may preferably be supplied by the generator located in the unit, and the devices may be controlled in wireless manner from the unit, although, if a work platform is used, this is primarily controlled (also using wireless control) from the control means in the platform.

It will be understood that the invention is not limited to the particular examples described above but may be used in connection with a wide variety of applications. Further, it will be understood that the system according to the invention may be designed in a multitude of varieties within the scope of the invention as specified in the claims. Thus, it will also be understood that the elements forming part of the device may be designed in numerous manners, as it will be evident to a person skilled in the art. Further, it is also noted that the device according to the invention may be equipped with means not illustrated in the drawings, such as e.g. cables and electric wires for power supply, communication etc. and means for providing mechanical operation, e.g. hoists, pneumatics, hydraulics etc. which will also be obvious to the skilled person.

Figure 16:
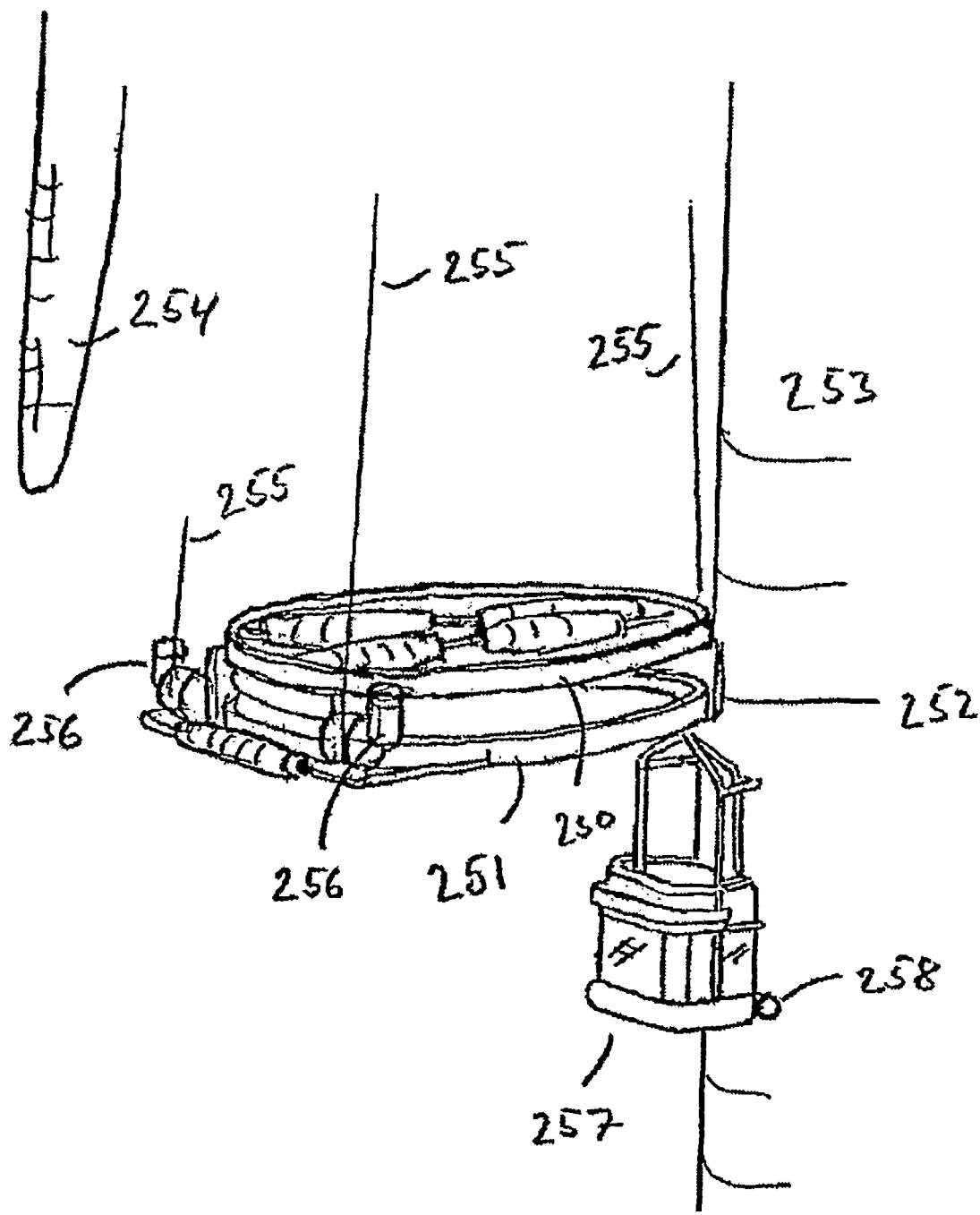
FIG. 16 shows a third embodiment of the present invention.

In FIG. 16 a device according to the third aspect of the present invention is shown. The device is constituted by a pair of aligned frames 250 and 251 interconnected by a number of rigid interconnections 252. In FIG. 16 the device is illustrated as being lifted up along the tower 253 of a windmill. The tip of a windmill blade 254 is shown to the right of the device. The device is lifted in three wires 255 which are anchored at the top of the windmill. The lifting force is provided by a number of electronic motors 256 arranged on the outside of the frames 250 and 251. A gondola 257 is movably arranged relative to the frame 251 which forms an endless track so that the gondola 257 can be moved 360 degrees around an object, such as a windmill blade, positioned in the opening defined by the frames 250 and 251. One or more wheels or rollers 258 are mounted on the backside of the gondola 257 for guiding the device during lifting/lowering of the device along the windmill tower 253. The gondola itself will be explained in further details in connection with FIG. 23. A number of rollers 259 for docking and fixating the windmill blade to the device are positioned within the opening of the frames. These docking rollers, and an alternative arrangement, will be described in further details in connection with FIGS. 20 and 21.

Figure 17:
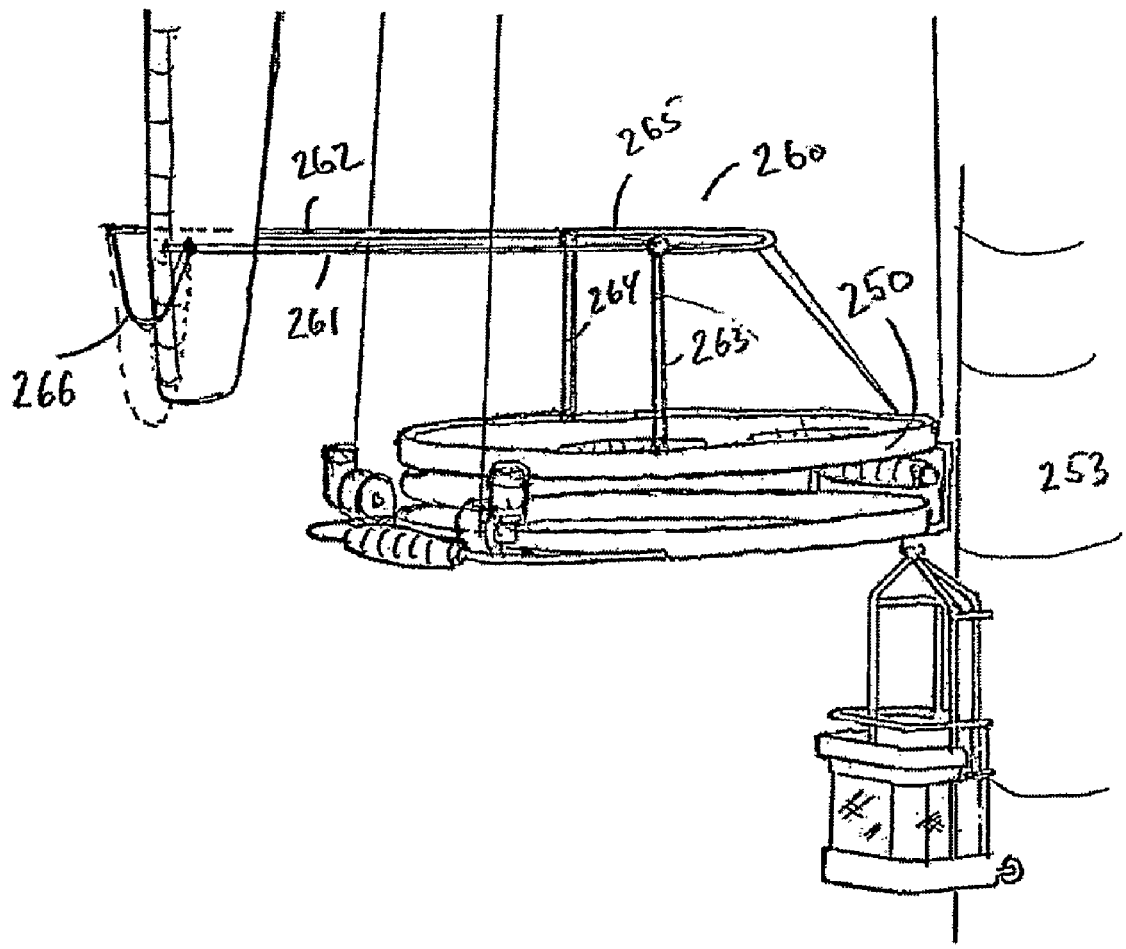
FIG. 17 shows the third embodiment of the present invention catching a blade of a windmill.

FIG. 17 shows the device of FIG. 16 elevated to a higher position on the windmill tower. FIG. 17 further shows an alignment arrangement 260 attached to the upper frame 250. The alignment arrangement 260 is adapted to bring the device from a position near the windmill tower to the windmill blade to be serviced, inspected or repaired. Thus, the alignment arrangement brings the device from the windmill tower to a position immediately below a substantially vertical oriented windmill blade in an easy, reliable and comfortable manner.

The alignment arrangement shown in FIG. 17 comprises two arms 261 and 262 each being pivotably mounted on a support arm 263 and 264. The arms 261 and 262 are interconnected by a connection element 265. Each of the arms 261 and 262 has some sort of guiding arrangement for guiding a catch element 266 to the ends of the arms. The catch element 266 is in FIG. 17 shown in two states—the dashed line illustrates the catch element in a relaxed state, whereas the solid line illustrates the catch element in a less relaxed state. The catch element itself can be a flexible wire or a flexible belt.

The guiding arrangement for guiding and thereby bringing the catch element to the windmill blade and afterwards pulling the device to the windmill blade (or vice versa) can be implemented in various ways. For example, the guiding arrangement can involve a wire arranged in a track formed in each of the arms 261 and 262. Thus, one wire is guided in a track formed in arm 261, whereas another and similar wire is guided in a track formed in arm 262. At the ends of wires pointing towards the ends of the arms an eye or a loop may be formed. These eyes or loop can independently be moved along the axial directions of the arms 261 and 262. The catch element 266 is, at one of its ends, connected to the eye or loop of the arm 261. The other end of the catch element 266 is connected to the eye or loop of the arm 262.

Figure 18:
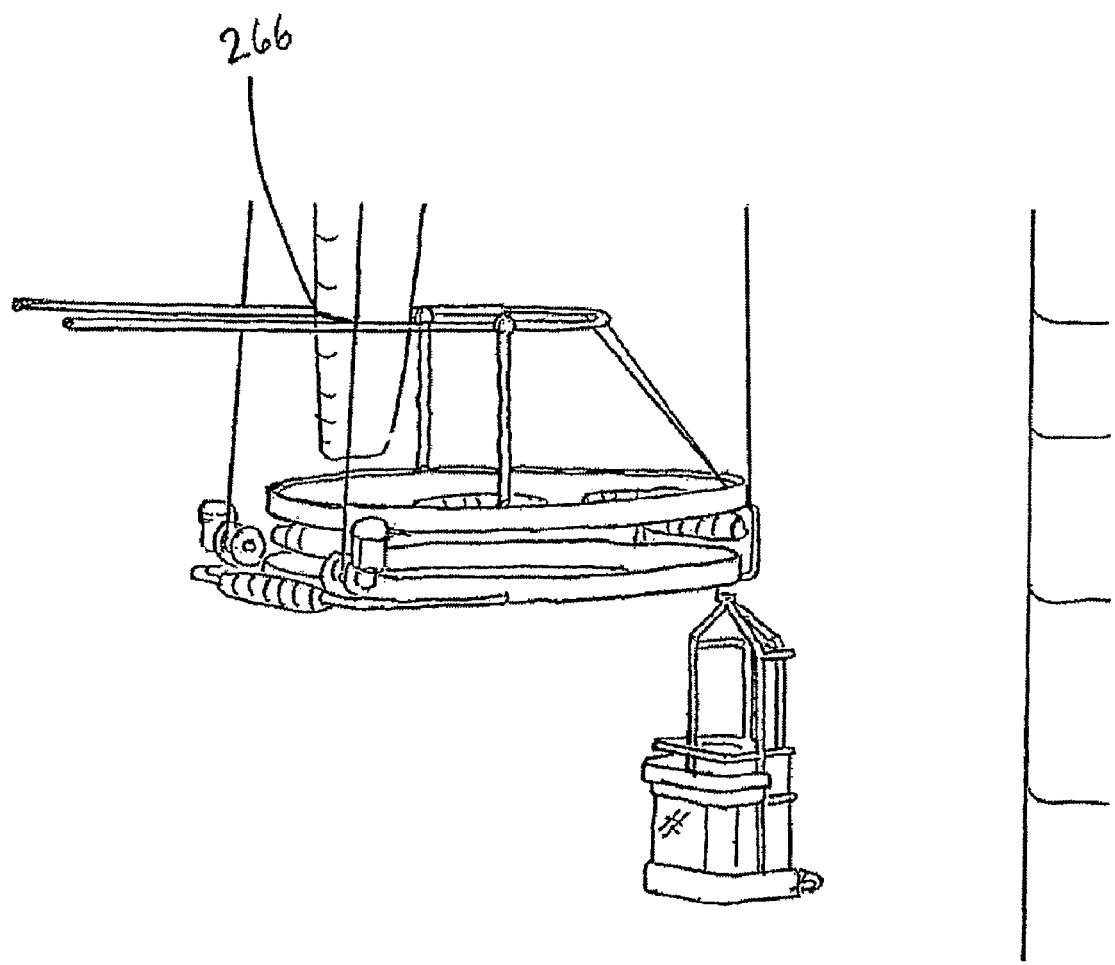
FIG. 18 shows the third embodiment of the present invention in almost complete alignment with a blade of a windmill.

FIG. 18 shows the situation where the device is free from the windmill tower and has been pulled towards the windmill blade using the alignment arrangement. It is seen that the device is not yet in complete alignment with the blade. In order to achieve this, the catch element needs to be withdrawn a little further which will bring the device further to the left and thereby into alignment with the windmill blade.

Figure 19:
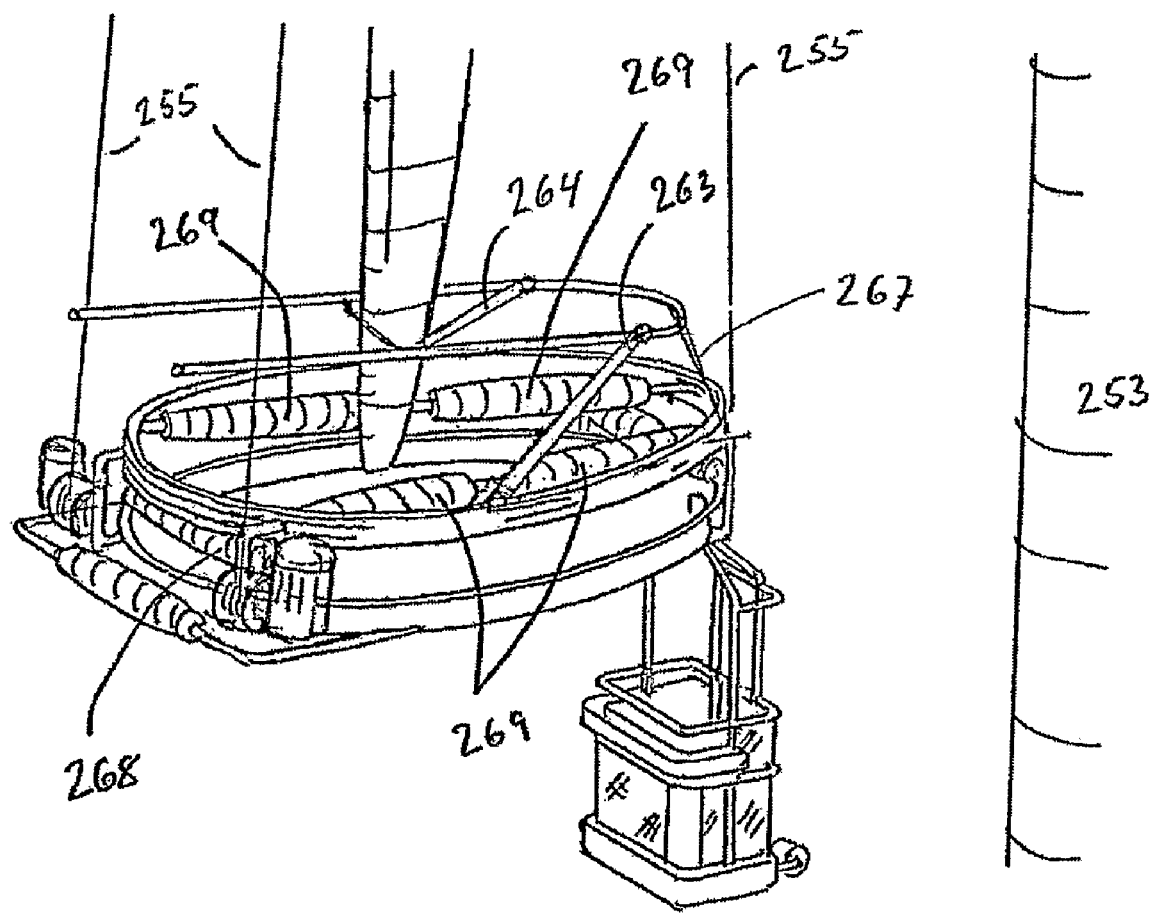
FIG. 19 shows the third embodiment of the present invention in alignment with a blade of a windmill.

Complete alignment between the device and the blade has been established in FIG. 19. Compared to FIG. 18, the supports arms 263 and 264 have been angled which brings the blade into complete alignment with the device. The angling of the support arms 263 and 264 has been provided by shortening the adjustment wire or belt 267. Compared to FIG. 18 the device has also been slightly lifted by shortening the wires 255, and the tip of the blade has now entered the opening of the frame. As soon as the top docking roller 268 and the side docking rollers 269 are able to obtain contact with the blade, the alignment arrangement can be fully withdrawn, and the blade and the device are then kept in a fixed horizontal relationship by the top and side rollers 268 and 269. The vertical alignment of the device is adjusted by shortening or extending the length of the wires 255.

Figure 20A:
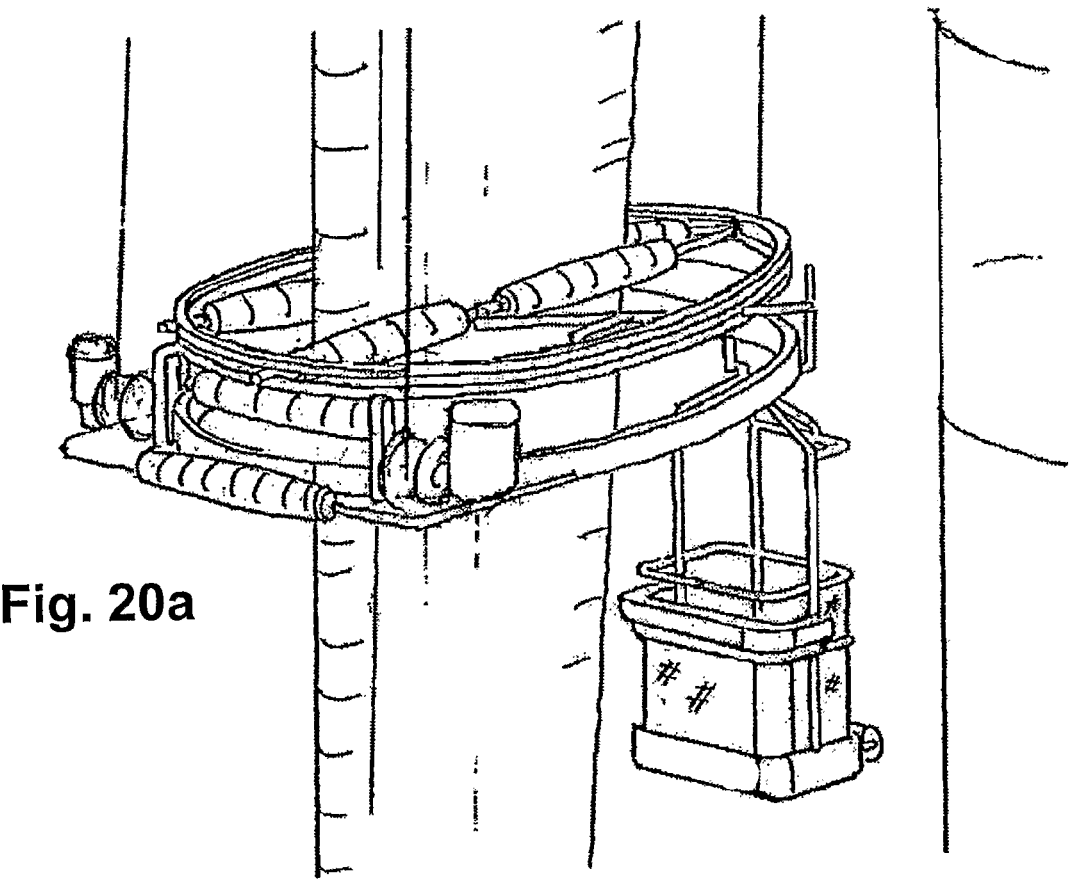
FIG. 20 shows the third embodiment of the present invention fixed to the blade of a windmill.
Figure 20B:
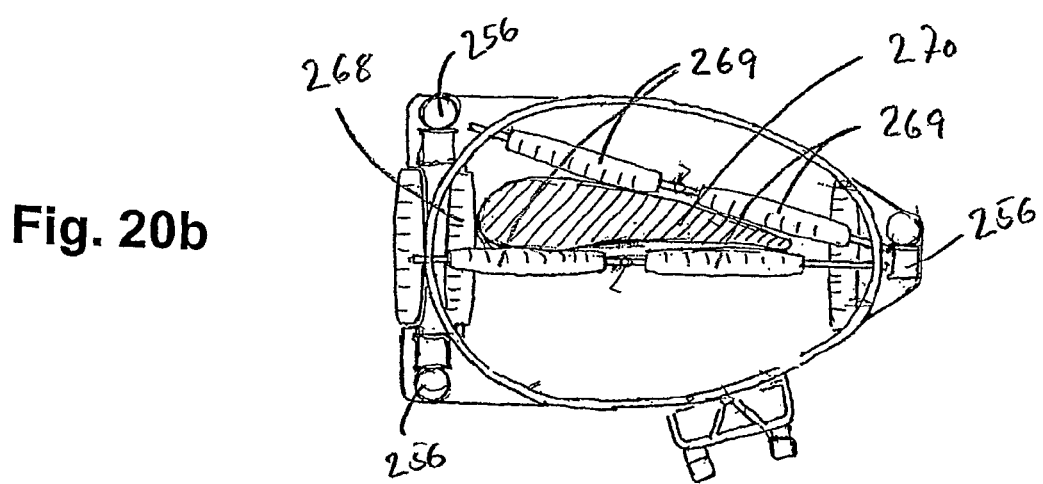

The positioning of the device relative to the blade is illustrated in FIGS. 20a and 20b, where FIG. 20b is a top view of the device with a windmill blade 270 fixated by rollers 268 and 269. The gondola is now allowed to move freely around the blade, and in principle any kind of service, inspection or repair may be performed at any vertical position of the blade. In FIGS. 20a and 20b the number of side rollers 269 is four. However, this number can in principle be arbitrary and it may vary with the size and shape of the blade. Thus, the number of side roller can be lower as well as higher than four. Similar arguments apply for the top roller 268. Also, the number of lifting arrangements 256 may vary from one device to another device.

Figure 21A:
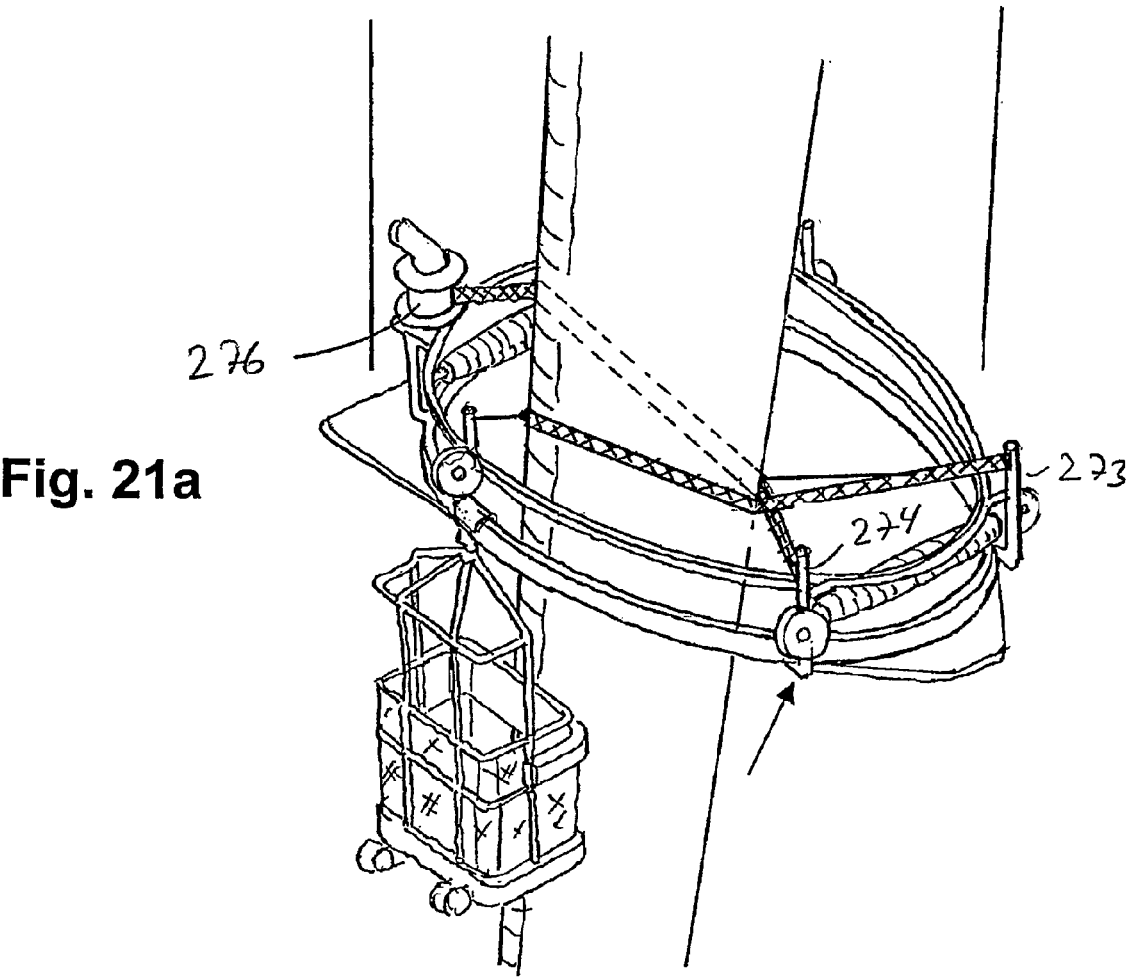
FIG. 21 shows the third embodiment of the present invention fixed to the blade of a windmill by alternative docking means.
Figure 21B:
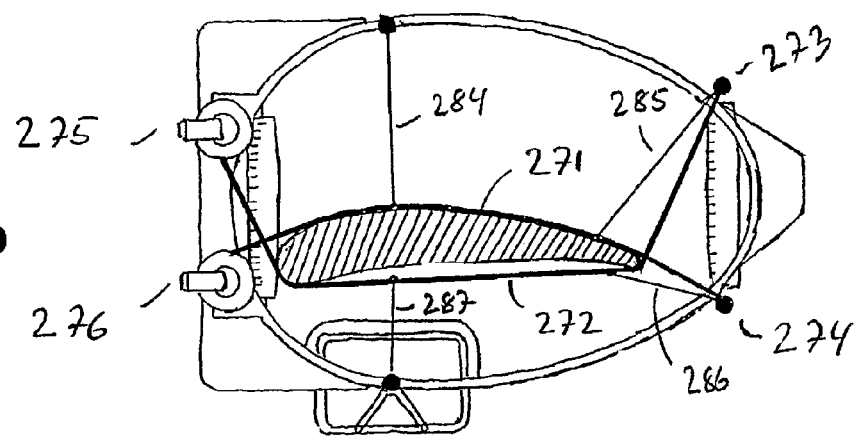
Figure 22A:
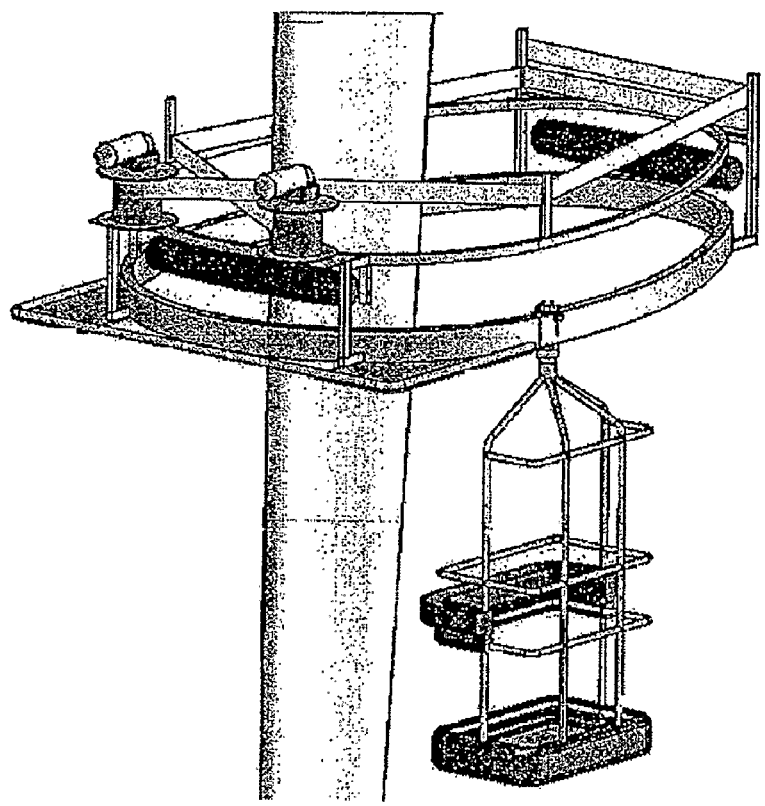
FIG. 22 shows the third embodiment of the present invention fixed to the blade of a windmill by alternative docking means.
Figure 22B:
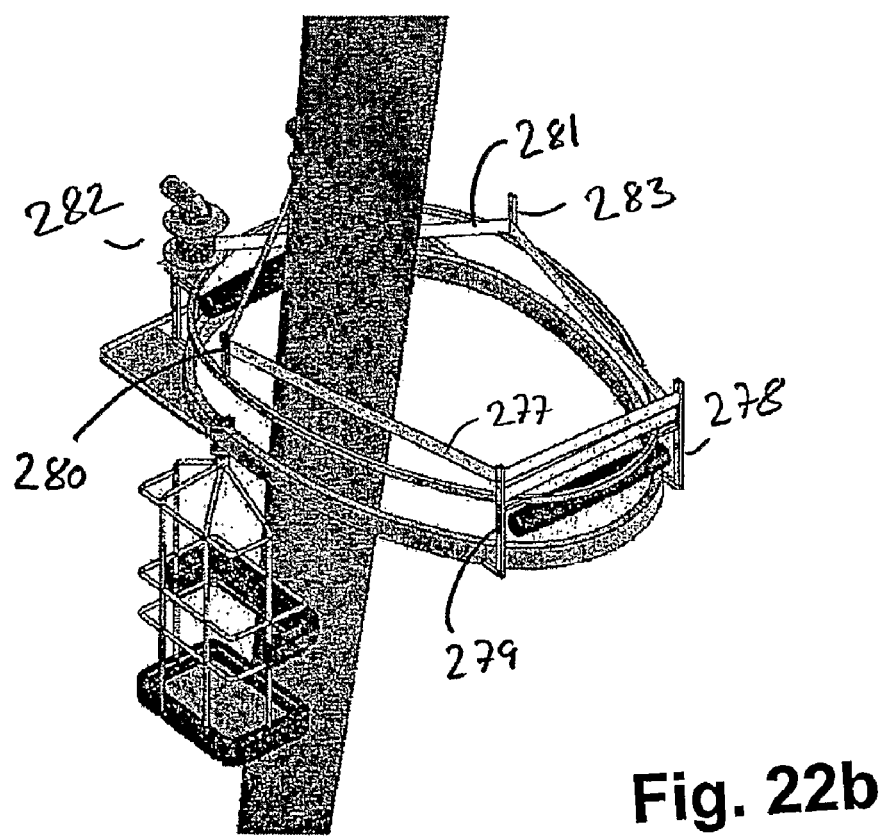

In FIGS. 21a and 21b, an alternative arrangement to the top and side rollers is illustrated. Here, the blade is fixated to the device using two flexible belts 271 and 272. Each belt is arranged between a rigid end point 273 and 274 and a belt tightener 275 and 276. As seen, the belt tighteners 275 and 276 and the end points 273 and 274 are mounted on the frame. The belt tighteners 275 and 276 are used to tighten the belts by bringing them from a relaxed state to a tightened state in order to fixate the windmill blade to the device. FIGS. 21a and 21b only show the tightened state of the belts, whereas FIGS. 22a and 22b illustrate the belts in the relaxed state. In the relaxed state, belt 277 is fixed to end point 278 and a belt tightner (not shown), and biased towards end point 279 and point 280. Similarly, in the relaxed state, belt 281 is fixed to end point 279 and belt tightener 282, and biased towards end point 278 and point 283.

The biasing of the belts can be provided by spring loading the belts via wires connecting the belts with points 278, 279, 280 and 281. Such wire connections are illustrated in FIG. 21b—see wires 284, 285, 286 and 287.

Figure 23A:
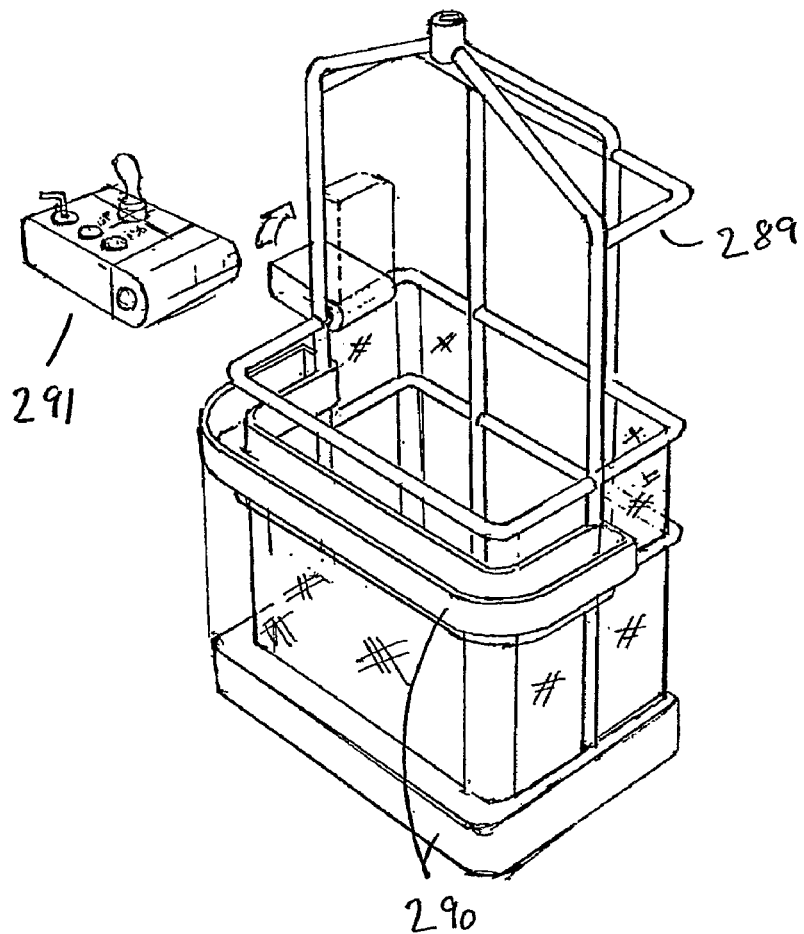
FIG. 23 shows the gondola according to the third embodiment of the present invention.
Figure 23B:
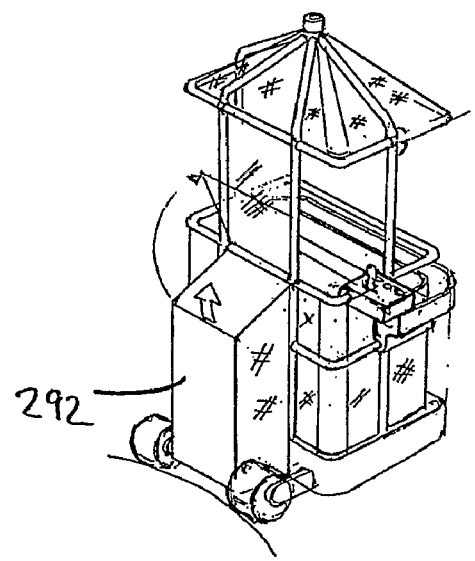

The gondola is shown in FIGS. 23a and 23b. As seen, the gondola is formed as an open cage of aluminium tubes 288 with fenders 290 arranged on the front of the cage. The fenders prevent that the gondola damages the windmill blade being inspected, serviced or repaired. The cage can accommodate one, two or even more individuals. The gondola also comprises a control panel 291 which allows the individual(s) using the gondola to move the gondola around the windmill blade and lift and/or lower the gondola relative to the blade. The up and down movements of the gondola can for example be provided by use of a Joystick. Further facilities such as rooms 292 for repair equipment can also be provided.

Figure 24:
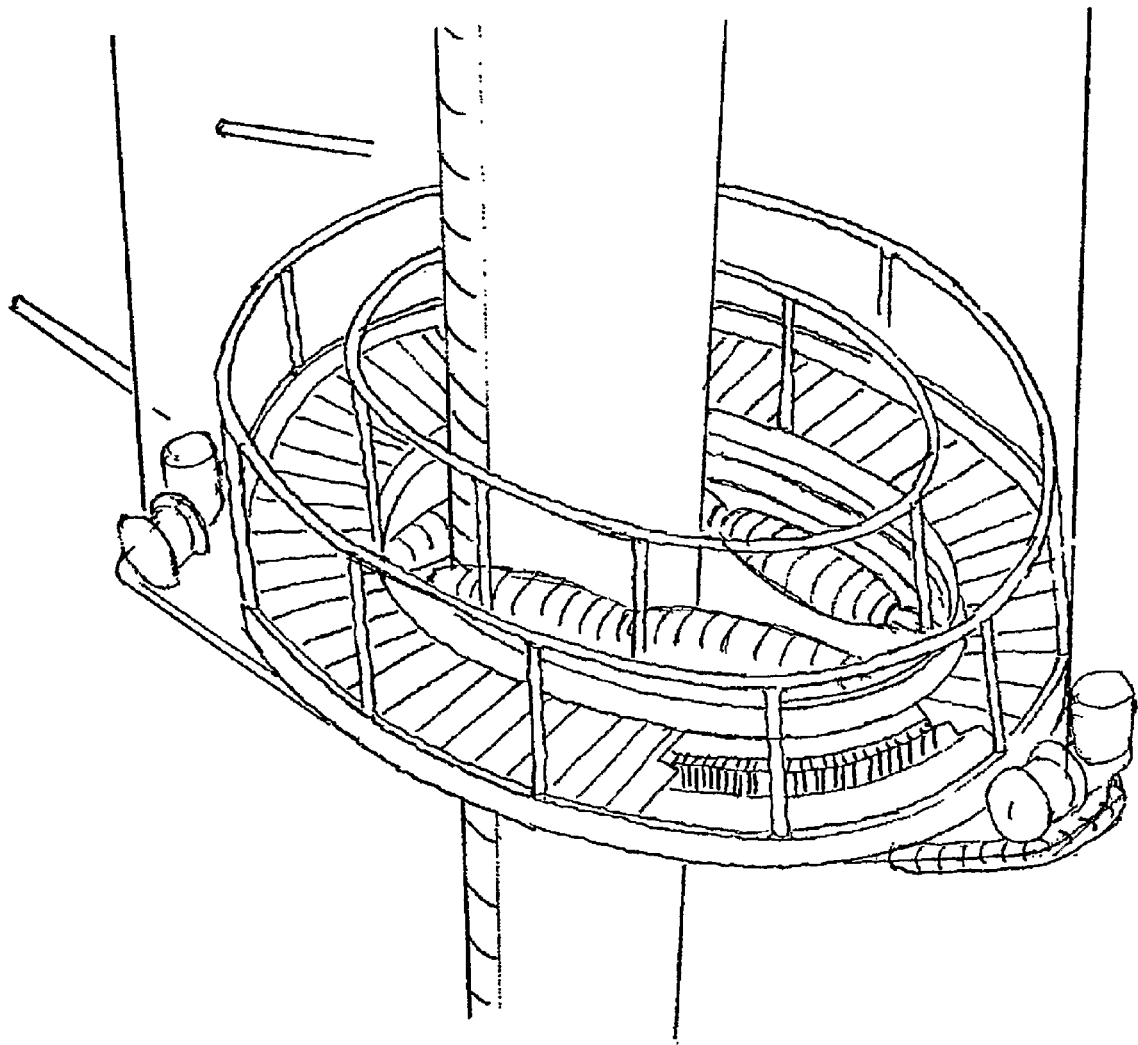
FIG. 24 shows the third embodiment of the present invention configured as a platform.

A final embodiment of the present invention is shown in FIG. 24. Here the gondola has been omitted and replaced by a 360 degrees working platform. The previously described alignment arrangement and the docking roller arrangement for fixating the device/platform to the blade also apply to this embodiment.

Finally it should be mentioned that the alignment arrangement used for bringing the device from the windmill tower to the blade is also applicable when service, inspection or repair of the blade is completed and the device is to be moved from the blade to the windmill tower and further down to ground level.

The invention claimed is:

1. A device for enabling access to a structure above ground level by lowering and/or lifting the device in relation to the structure, the device comprising a first endless frame structure defining an opening, wherein at least part of the first endless frame structure forms a track portion, the track portion being adapted to guide, in relation to the track portion, a movable object along the track portion, and an alignment arrangement disposed above the first endless frame structure and extending laterally outward, beyond the perimeter of the first endless frame structure, the alignment arrangement configured to engage the structure and align the structure with the opening defined by the first endless frame structure.

2. The device according to claim 1, further comprising a second endless frame structure defining an opening, the second endless frame structure being aligned with the first endless frame structure.

3. The device according to claim 1, wherein the first endless frame structure forms an endless track.

4. The device according to claim 1, wherein the object comprises a work platform adapted to carry one or more individuals.

5. The device according to claim 1, wherein the object comprises control means configured to control the position of the object in relation to the track portion.

6. The device according to claim 1, wherein the first endless frame structure forms an essentially elongated structure.

7. The device according to claim 1, further comprising lifting and/or lowering means configured to lift, lower and/or displace the device in relation to the structure, the lifting and/or lowering means comprising power means.

8. The device according to claim 1, further comprising control means configured to control the lifting and/or lowering means.

9. The device according to claim 1, wherein the device is adapted to assist individuals in performing inspection, work, repair, surface treatment and the like on a rotor blade of a wind turbine.

10. The device according to claim 1, wherein the alignment arrangement comprises a first displaceable arm having guiding means, the first displaceable arm being adapted to be brought from a first position to a second position when the device is to be aligned with the structure, the first displaceable arm being, when in the second position, capable of bringing a catch element into contact with the structure via the guiding means of the first displaceable arm, and bringing the device in approximate or complete alignment with the structure by drawing the catch element along the guiding means of the first displaceable arm while the catch element is in contact with the structure.

11. The device according to claim 10, further comprising a second displaceable arm having guiding means, the second displaceable arm being adapted to be brought from a first position to a second position when the device is to be aligned with the structure, the first displaceable arm and the second displaceable arm being, when in the second position, capable of bringing a catch element into contact with the structure via the guiding means of both the first displaceable arm and the second displaceable arm, and bringing the device in approximate or complete alignment with the structure by drawing the catch element along the guiding means of both the first displaceable arm and the second displaceable arm while the catch element is in contact with the structure.

12. The device according to claim 11, wherein the first displaceable arm and the second displaceable arm are pivotally mounted on a first support element and a second support element, respectively.

13. The device according to claim 12, wherein the first support element and the second support element are pivotally mounted on the first endless frame structure.

14. The device according to claim 1 further comprising rotatably mounted docking means arranged in the opening defined by the first endless frame structure, the rotatably mounted docking means being adapted to fixate the structure in relation to the device when the structure has been brought into the opening defined by the first endless frame structure.

15. The device according to claim 14, wherein a total of at least five rotatably mounted docking means are arranged in the opening defined by the first endless frame structure.

16. The device according to claim 1, further comprising a docking arrangement adapted to fixate the structure in relation to the device when the structure has been brought into the opening defined by the first endless frame structure, the docking arrangement comprising a pair of flexible belts, each belt being arranged between a rigid end point and a belt tightener, the belt tighteners and the end points being arranged on the first endless frame structure, each of the belt tighteners being adapted to tighten the respective belt by bringing the respective belt from a relaxed state to a tightened state in order to fixate the structure in relation to the device.

17. A device for enabling access to a structure above ground level by lowering and/or lifting the device in relation to the structure, the device comprising an endless frame forming a path for individuals, the endless frame forming a path defining an opening, and an alignment arrangement disposed above the first endless frame structure and extending laterally outward, beyond the perimeter of the first endless frame, the alignment arrangement configured to engage the structure and align the structure with the opening defined by the endless frame.

18. The device according to claim 17, wherein the alignment arrangement comprises a first displaceable arm having guiding means, the first displaceable arm being adapted to be brought from a first position to a second position when the device is to be aligned with the structure, the first displaceable arm being, when in the second position, capable of bringing a catch element into contact with the structure via the guiding means of the first displaceable arm, and bringing the device in approximate or complete alignment with the structure by drawing the catch element along the guiding means of the first displaceable arm while the catch element is in contact with the structure.

19. The device according to claim 18, further comprising a second displaceable arm having guiding means, the second displaceable arm being adapted to be brought from a first position to a second position when the device is to be aligned with the structure, the first displaceable arm and the second displaceable arm being, when in the second position, capable of bringing a catch element into contact with the structure via the guiding means of both the first displaceable arm and the second displaceable arm, and bringing the device in approximate or complete alignment with the structure by drawing the catch element along the guiding means of both the first displaceable arm and the second displaceable arm while the catch element is in contact with the structure.

20. The device according to claim 17, further comprising rotatably mounted docking means arranged in the opening defined by the endless path, the rotatably mounted docking means being adapted to fixate the structure in relation to the device when the structure has been brought into the opening defined by the endless path.

21. The device according to claim 20, wherein a total of at least five rotatably mounted docking means are arranged in the opening defined by the endless path.

22. The device according to claim 2, further comprising a second displaceable arm having guiding means, the second displaceable arm being adapted to be brought from a first position to a second position when the device is to be aligned with the structure, the first displaceable arm and the second displaceable arm being, when in the second position, respectively, capable of bringing a catch element into contact with the structure via the guiding means of both the first displaceable arm and the second displaceable arm, and bringing the device in approximate or complete alignment with the structure by drawing the catch element along the guiding means of both the first displaceable arm and the second displaceable arm while the catch element is in contact with the structure.

23. The device according to claim 22, wherein the first displaceable arm and the second displaceable arm are pivotally mounted on a first support element and a second support element, respectively.

24. The device according to claim 23, wherein the first support element and the second support element are pivotally mounted on the first endless frame structure or the second endless frame structure.

25. The device according to claim 2, further comprising rotatably mounted docking means arranged in the opening defined by the first endless frame structure or the opening defined by the second endless structure, the rotatably mounted docking means being adapted to fixate the structure in relation to the device when the structure has been brought into the opening defined by the first endless frame structure or the opening defined by the second endless frame structure.

26. The device according to claim 25, wherein a total of at least five rotatably mounted docking means are arranged in the opening defined by the first endless frame structure or the opening defined by the second endless frame structure.

27. The device according to claim 2, further comprising a docking arrangement adapted to fixate the structure in relation to the device when the structure has been brought into the opening defined by the first endless frame structure or the opening defined by the second endless frame structure, the docking arrangement comprising a pair of flexible belts, each belt being arranged between a rigid end point and a belt tightener, the belt tighteners and the end points being arranged on the first endless frame structure or the second endless frame structure, each of the belt tighteners being adapted to tighten the respective belt by bringing the respective belt from a relaxed state to a tightened state in order to fixate the structure in relation to the device.

* * * * *